United States Patent
Chan et al.

(10) Patent No.: US 11,075,830 B2
(45) Date of Patent: Jul. 27, 2021

(54) DIVERSITY ROUTING TO IMPROVE DELAY-JITTER TRADEOFF IN UNCERTAIN NETWORK ENVIRONMENTS

(71) Applicant: Massachusetts Institute of Technology, Cambridge, MA (US)

(72) Inventors: Vincent W. S. Chan, Lincoln, MA (US); Arman Rezaee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 23 days.

(21) Appl. No.: 16/600,470

(22) Filed: Oct. 12, 2019

(65) Prior Publication Data

US 2020/0120006 A1 Apr. 16, 2020

Related U.S. Application Data

(60) Provisional application No. 62/745,061, filed on Oct. 12, 2018.

(51) Int. Cl.
*H04L 12/26* (2006.01)
*H04L 12/727* (2013.01)
(Continued)

(52) U.S. Cl.
CPC .......... *H04L 43/087* (2013.01); *H04L 45/121* (2013.01); *H04L 45/14* (2013.01); *H04L 45/22* (2013.01); *H04L 45/70* (2013.01)

(58) Field of Classification Search
CPC ..... H04L 43/087; H04L 45/121; H04L 45/14; H04L 45/22; H04L 45/70; H04L 40/02;
(Continued)

(56) References Cited

U.S. PATENT DOCUMENTS 6,816,464 B1 * 11/2004 Scott .................... H04L 41/142
370/238
7,624,060 B2 11/2009 Michaud et al.
(Continued)

OTHER PUBLICATIONS

R. A. Brealey, S. C. Myers, F. Allen, and P. Mohanty, Principles of corporate finance. Tata McGraw-Hill Education, 2012.
(Continued)

*Primary Examiner* — Kibrom T Hailu
(74) *Attorney, Agent, or Firm* — Sunstein LLP

(57) ABSTRACT

Systems and methods reduce delivery delay jitter in a delivery network. A processor identifies a plurality of routes between an originating node and a destination node. Each route has a respective mean delivery delay time and a respective delivery delay jitter. The processor solves a convex optimization problem for a plurality of values of delivery delay, thereby yielding a plurality of solutions. Each solution represents a corresponding allocation of traffic among the plurality of routes. Each allocation of traffic has a corresponding mean delivery delay time and a corresponding mean delivery delay jitter. The processor selects, from the plurality of solutions, a selected solution, which has a mean delivery delay jitter less than the delivery delay jitter of any route of the plurality of routes. Traffic is automatically distributed over the plurality of routes according to the allocation of traffic that corresponds to the selected solution.

15 Claims, 10 Drawing Sheets

(51) Int. Cl.
*H04L 12/721* (2013.01)
*H04L 12/707* (2013.01)

(58) Field of Classification Search
CPC .............. H04L 43/0852; H04L 47/283; H04W 28/0967; H04W 28/0975
See application file for complete search history.

(56) References Cited

U.S. PATENT DOCUMENTS

| | | | |
|---|---|---|---|
| 10,050,740 B2 | 8/2018 | Zhang et al. | |
| 10,256,939 B2 | 4/2019 | Zhang et al. | |
| 2005/0152339 A1* | 7/2005 | Scott | H04L 41/142 370/352 |
| 2007/0008967 A1* | 1/2007 | Bressler | H04L 47/15 370/390 |
| 2016/0226742 A1* | 8/2016 | Apathotharanan | H04L 43/106 |
| 2019/0280983 A1* | 9/2019 | Thubert | H04L 47/30 |

OTHER PUBLICATIONS

E. Elton, M. Gruber, S. Brown, and W. Goetxmann, Modern Portfolio Theory and Investment Analysis. John Wiley & Sons, 2009.
L. Kleinrock, Queueing Systems vol. I: Theory, vol. 1. New York: John Wiley & Sons, 1975.
H. M. Markowitz, "The early history of portfolio theory: 1600-1960," Financial Analysts Journal, vol. 55, No. 4, pp. 6-16, 1999.
H. Markowitz, "Portfolio selection," The journal of finance, vol. 7, No. 1, pp. 77-91, 1952.
E. Crawley, R. Nair, B. Rajagopalan, and H. Sandick, "RFC2386: A Framework for QoS-Based Routing," Network Working Group, 1998.
"Cisco vni: Forecast and methodology, 2016-2021," Jun. 2017.
"The zettabyte era: Trends and analysis," Jun. 2017.
S. K. Singh, T. Das, and A. Jukan, "A survey on internet multipath routing and provisioning," IEEE Communications Surveys Tutorials, vol. 17, pp. 2157-2175, Fourthquarter 2015.
Enterprise QoS Solution Reference Network Design Guide, Chapter 1: Quality of Service Design Overview, Version 3.3, Cisco, pp. 1-34, Nov. 2005.
European Patent Office, International Search Report and Written Opinion for PCT Application No. PCT/US2019/056010, dated Mar. 18, 2020, 22 pages.
Meshbahi, Nabil et al, "An efficient algorithm for traffic flow optimization in MPLS networks", 2015 International Conference on Protocol Engineering (ICPE) and International Conference on New Technologies of Distributed System (NTDS), IEEE, Jul. 22, 2015, pp. 1-6.
Shin, Junghwan et al, "Concurrent multipath routing over bounded paths: Minimizing delay variance", 2013 IEEE Global Communications Conference (Globecom), IEEE, Dec. 9, 2013, pp. 1483-1488.
Okuyama, T. et al, "Proposal of multipath routing method focusing on reducing delay jitter", Communications, Computers and Signal Processing, 2005 IEEE Pacific Rim Conference on Victoria, BC, Canada, Aug. 24-26, 2005, pp. 296-299.
European Patent Office, Invitation to Pay Additional Search Fees and Partial Search Report for PCT Application No. PCT/US2019/056010, dated Jan. 24, 2020, 20 pages.

* cited by examiner

DIVERSITY ROUTING TO IMPROVE DELAY-JITTER TRADEOFF IN UNCERTAIN NETWORK ENVIRONMENTS

CROSS REFERENCE TO RELATED APPLICATIONS

This application claims the benefit of U.S. Provisional Patent Application No. 62/745,061, filed Oct. 12, 2018, titled "Diversity Routing to Improve Delay-Jitter Tradeoff in Uncertain Network Environments," the entire contents of which are hereby incorporated by reference herein, for all purposes.

STATEMENT REGARDING FEDERALLY SPONSORED RESEARCH OR DEVELOPMENT

This invention was made with Government support under Grant No. CNS1717199 by the National Science Foundation. The Government has certain rights in this invention.

BACKGROUND

Technical Field

The present invention relates to computer communication packet, physical parcel, product or service delivery networks and, more particularly, to systems and methods for reducing jitter in such networks.

Related Art

The networking world is preparing for an unprecedented growth in adoption of time-sensitive and high-bandwidth applications in the upcoming decade. According to Cisco, IP video traffic will be 82 percent of all IP traffic by 2021, up from 73 percent in 2016 [1, 2]. The same reports forecast live video to grow 15-fold while virtual reality (VR) and augmented reality (AR) traffic will increase 20-fold in the same period. The interactive nature of these applications requires low latency but more importantly they are extremely sensitive to variation of delay, which is often referred to as "jitter." In packet switched networks, jitter is often defined as the standard deviation of packet delay, and we shall use this definition of jitter in our analysis and exposition. As an example, suppose that packets arrive according to a Poisson process of rate $\lambda$ (packets per second), then the packet interarrivals will have an exponential distribution with mean $1/\lambda$ seconds and standard deviation of $1/\lambda$. The aforementioned standard deviation is what we will refer to as jitter, which measures how much the delay of a given packet deviates from the "average."

Other applications such as high-frequency trading, and tele-surgery are also extremely sensitive to jitter. For example, high-frequency traders would like to guarantee that their orders reach various exchanges at the same time, i.e., within less than about 1 ms of each other, otherwise the execution of the first order at a given exchange may reveal their intent to other investors who can manipulate market prices by front-running the rest of the orders. Similarly, surgeons who want to conduct a remote operation on a patient (tele-surgery) expect a network that can deliver responsive and jitter-free haptic feedback. The proliferation of these applications presents a chicken and egg problem for network engineers: on the one hand, these applications require low latency and low jitter but at the same time the bursty and dynamic nature of their traffic introduces unpredictable delay and increases the jitter.

In addition to the earlier examples, we should note that jitter is a symptomatic characteristic of dynamic network environments and arises naturally as a result of dynamic resource consumption and exhaustion within the networks. In such networks, users and applications can introduce bursty and unpredictable new flows into a given packet stream. Introduction of potentially massive new flows into a given stream causes additional competition for available network resources causing additional buffering at queues and increasing the delay along those paths. Similarly, when an application terminates a large flow, this termination reduces congestion and buffering at various queues, hence decreasing the delay along those paths. Such rapid changes in the end-to-end delay of a path connecting an origin-destination (OD) pair is common place in todays networks, and applications experience its effects as jitter.

The continuous variation and abrupt changes introduced by exogenous traffic create temporary bottlenecks in the network, which manifest themselves as jitter. Traditionally, packet buffers were deployed to combat the negative effects of jitter. When the instantaneous packet arrival rate at a queue exceeds the queue's output rate, packets are stored in the buffer until the pockets can be transmitted through outgoing ports. Not surprisingly, increasing the buffer size is not an attractive solution, as it is costly and increases the potential for excessive delay and jitter. Other solutions include over-provisioning the network or providing dedicated paths/circuits to such applications, both of which are uneconomical.

We may wonder how jitter impacts the Quality of Service (QoS) to an end user. To answer this question we should note that users and applications prefer to operate in a static environment, because such an environment allows them to tune their internal parameters for optimal operation in that specific environment. As an example, consider a video teleconferencing application. A typical video teleconferencing application seeks to provide the highest possible video quality to users. Given a fixed bandwidth and a prespecified delay, the application can decide on a specific video coding scheme (codec) that closely matches the desired QoS metrics. However, if the available bandwidth or the delay performance of the network changes, the application has to determine latest network state and adapt the video codec to the new network environment. It should be noted that when the state of the network changes too rapidly, as measured by its jitter, it becomes almost impossible to accurately identify and track the current state of the network. Furthermore, any mistake that results in a wrong choice of codecs will either degrade the QoS or waste valuable network resources. Other types of applications suffer in a similar fashion when unpredictable network dynamics induce additional jitter or other erratic behavior.

One may think that jitter can be accounted for by a network management and control (NMC) system that continuously monitors the state of the network to guarantee a desired Quality of Service (QoS). Unfortunately, current NMC systems are much too slow to track the state of various network elements with the desired level of precision. Furthermore, tracking the state of dynamic networks of the future will be a rather costly undertaking. Hence, any meaningful solution should strive to meet application demands, despite the unavoidable uncertainty about the instantaneous state of a network.

SUMMARY OF EMBODIMENTS

An embodiment of the present invention provides a computer-implemented method for reducing delivery delay jitter in a delivery network. The delivery network is subject to variations in delivery delay time. The method includes receiving, by a processor, an electronic request to transport traffic between an originating node of the network and a destination node of the network. The electronic request specifies a maximum acceptable mean delivery delay and a maximum acceptable jitter in the delivery delay time.

The processor automatically identifies a plurality of routes between the originating node and the destination node. Each route of the plurality of routes has a respective mean delivery delay time and a respective delivery delay jitter.

The processor automatically solves a convex optimization problem for a plurality of values of delivery delay. The processor thereby yields a plurality of solutions. Each solution represents a corresponding allocation of traffic among the plurality of routes. Each allocation of traffic has a corresponding mean delivery delay time and a corresponding mean delivery delay jitter.

The processor automatically selects, from the plurality of solutions, a selected solution. The selected solution has a mean delivery delay jitter less than the delivery delay jitter of any route of the plurality of routes.

The traffic is automatically distributed over the plurality of routes according to the allocation of traffic that corresponds to the selected solution.

Optionally, in any embodiment, the network may include a computer network, and the traffic may include computer network packets.

Optionally, in any embodiment, the traffic may include physical goods, and the network may include a cargo transportation network that physically transports the physical goods.

Optionally, in any embodiment, the network may include a plurality of suppliers of a good and/or service. Each route may correspond to a respective one of the plurality of suppliers of the good and/or service. Each mean delivery time may correspond to a mean delivery time to supply the good and/or service by a respective one of the plurality of suppliers of the good and/or service. Each delivery delay jitter may correspond to a reputation of a respective one of the plurality of suppliers of the good and/or service. The allocation of traffic among the plurality of routes may correspond to an allocation of orders among the plurality of suppliers of the good and/or service.

Optionally, in any embodiment, the network may include an electric power distribution system, and the traffic may include electricity distributed via the network.

Optionally, in any embodiment, the processor may automatically ascertain feasibility of satisfying the request, based at least in part on available routes in the network. Automatically identifying the plurality of routes may include automatically identifying the plurality of routes only if satisfying the request is found by the processor to be feasible.

Optionally, in any embodiment, automatically ascertaining feasibility of satisfying the request may include automatically ascertaining, by the processor, feasibility of satisfying the request based at least in part on the specified maximum acceptable mean delivery delay.

Optionally, in any embodiment, automatically ascertaining feasibility of satisfying the request may include automatically ascertaining, by the processor, feasibility of satisfying the request based at least in part on the specified maximum acceptable jitter in the delivery delay.

Optionally, in any embodiment, automatically ascertaining feasibility of satisfying the request may include automatically ascertaining, by the processor, feasibility of satisfying the request based at least in part on the specified maximum acceptable mean delivery delay and based at least in part on the specified maximum acceptable jitter in the delivery delay.

Optionally, in any embodiment, the plurality of values of delivery delay may extend from a minimum mean delivery delay time to a maximum mean delivery delay time of the plurality of routes.

Optionally, in any embodiment, automatically selecting the selected solution may include automatically selecting the selected solution, such that the selected solution has a delivery delay jitter less than any other solution of the plurality of solutions.

Optionally, in any embodiment, the convex optimization problem may include:

$$\underset{F}{\text{minimize}}$$
subject to
$$F^T \sum F$$
$$e^T F = 1$$
$$F^T \mu = \mu^*$$
$$0 \leq f_i \leq 1, \quad i = 1, \ldots, n$$

Optionally, in any embodiment, the convex optimization problem may include:

$$\underset{F}{\text{minimize}}$$
subject to
$$C^T F + F^T \sum F$$
$$e^T F = 1$$
$$F^T \mu = \mu^*$$
$$0 \leq f_i \leq 1, \quad i = 1, \ldots, n$$

Another embodiment of the present invention provides a system for reducing delivery delay jitter in a delivery network. The delivery network is subject to variations in delivery delay time. The system includes a processor configured to receive an electronic request to transport traffic between an originating node of the network and a destination node of the network. The electronic request specifies a maximum acceptable mean delivery delay and a maximum acceptable jitter in the delivery delay time.

The processor is configured to automatically identify a plurality of routes between the originating node and the destination node. Each route of the plurality of routes has a respective mean delivery delay time and a respective delivery delay jitter.

The processor is configured to automatically solve a convex optimization problem for a plurality of values of delivery delay. The processor is configured to thereby yield a plurality of solutions. Each solution represents a corresponding allocation of traffic among the plurality of routes. Each allocation of traffic has a corresponding mean delivery delay time and a corresponding mean delivery delay jitter.

The processor is configured to automatically select, from the plurality of solutions, a selected solution. The selected solution has a mean delivery delay jitter less than the delivery delay jitter of any route of the plurality of routes.

The processor is configured to automatically distribute the traffic over the plurality of routes according to the allocation of traffic that corresponds to the selected solution.

Optionally, any embodiment of the system may include any of the features described with respect to the afore-mentioned computer-implemented method for reducing delivery delay jitter in a delivery network. For example, optionally, in any embodiment of the system, the network may include a computer network, and the traffic may include computer network packets.

Yet another embodiment of the present invention provides a non-transitory computer-readable medium. The non-transitory computer-readable medium is encoded with instructions. When executed by a processor, the instructions establish processes for performing a computer-implemented method of reducing delivery delay jitter in a delivery network. The delivery network is subject to variations in delivery delay time. The processes include a process configured to receive an electronic request to transport traffic between an originating node of the network and a destination node of the network. The electronic request specifies a maximum acceptable mean delivery delay and a maximum acceptable jitter in the delivery delay time.

A process is configured to automatically identify a plurality of routes between the originating node and the destination node. Each route of the plurality of routes has a respective mean delivery delay time and a respective delivery delay jitter.

A process is configured to automatically solve a convex optimization problem for a plurality of values of delivery delay. The process thereby yields a plurality of solutions. Each solution represents a corresponding allocation of traffic among the plurality of routes. Each allocation of traffic has a corresponding mean delivery delay time and a corresponding mean delivery delay jitter.

A process is configured to automatically select, from the plurality of solutions, a selected solution. The selected solution has a mean delivery delay jitter less than the delivery delay jitter of any route of the plurality of routes.

A process is configured to automatically distribute the traffic over the plurality of routes according to the allocation of traffic that corresponds to the selected solution.

Optionally, any embodiment of the non-transitory computer-readable medium may include any of the features described with respect to the afore-mentioned computer-implemented method or system for reducing delivery delay jitter in a delivery network. For example, optionally, in any embodiment of the non-transitory computer-readable medium, the network may include a computer network, and the traffic may include computer network packets.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
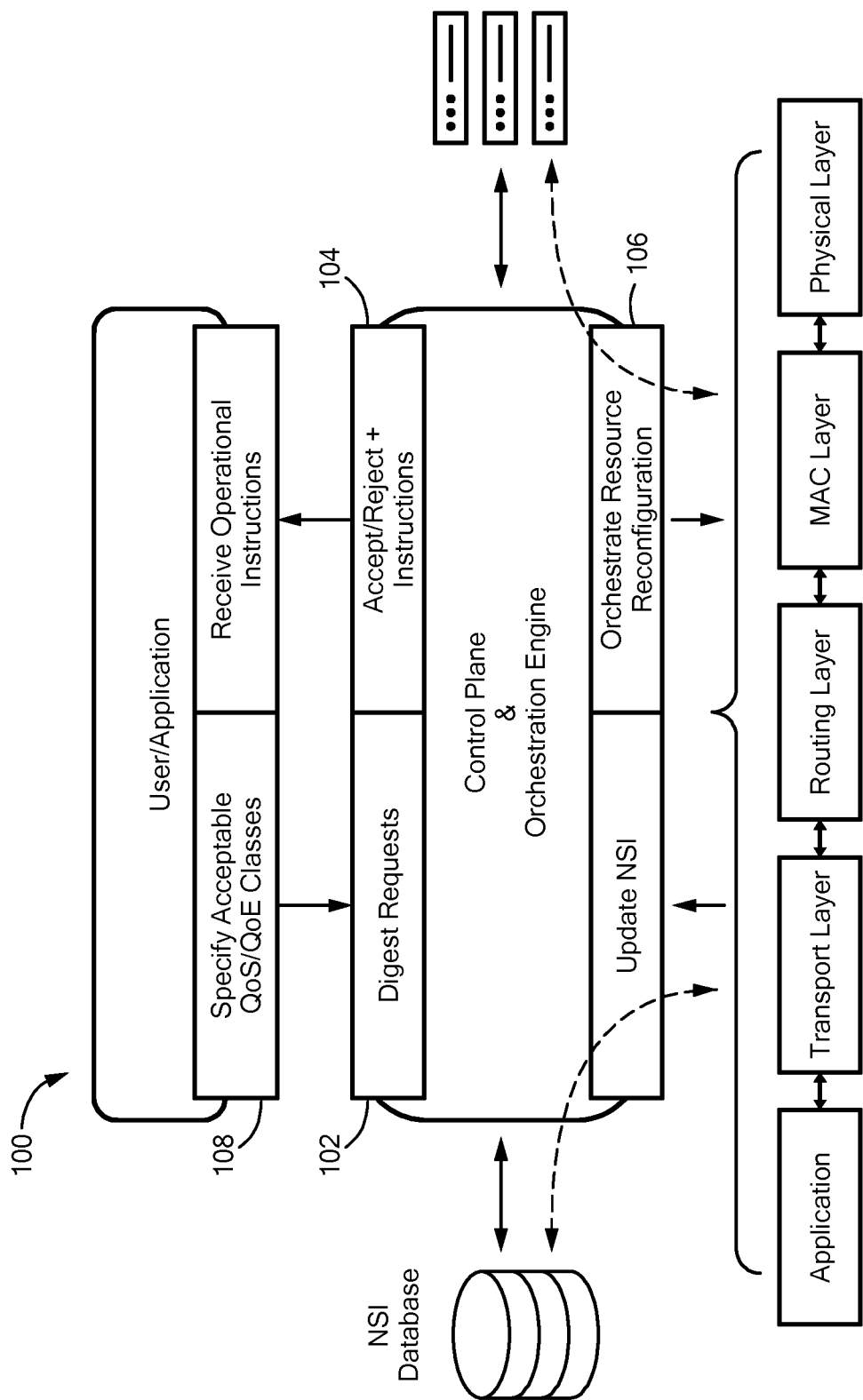
FIG. 1 is a schematic block diagram of roles and responsibilities of a network management and control (NMC) system, according to an embodiment of the present invention.

Embodiments of the present invention deliver improved delay-jitter performance in dynamic networks. Dynamic networks experience rapid and unpredictable fluctuations and hence a certain amount of uncertainty about the delay-performance of various network elements is unavoidable. This uncertainty makes it difficult for network operators to guarantee a certain quality of service (QoS), in terms of delay and jitter, to users. The uncertainty about the state of the network is often overlooked to simplify problem formulation, but we capture it by modeling the delay on various links as general and potentially correlated random processes.

Within this framework, a user requests a certain delay-jitter performance guarantee from the network. After verifying feasibility of the request, the network responds to the user by specifying a set of routes, as well as a proportion of traffic which should be sent through each route, to achieve the desired QoS. We use mean-variance analysis as the basis for traffic distribution and route selection, and show that this technique can significantly reduce end-to-end jitter, because it accounts for the correlated nature of delays across different paths. The resulting traffic distribution is often non-uniform, and the fractional flow on each path is the solution to a simple convex optimization problem.

1. Introduction

This brings us to the ultimate question: Can we accommodate these new applications, with their latency and jitter requirements, despite our relative uncertainty about the state of a network and without massive over-provisioning? In most cases, the answer is yes. The solution involves an innovative technique to distribute traffic flow over multiple paths in such a way that guarantees lower end-to-end jitter, despite delay variations on individual links. This may seem counterintuitive at first, but as demonstrated in the following sections, if we account for the correlated nature of delay across various paths, we can trade slightly higher average delay for significantly reduced jitter.

This novel solution is inspired by Harry Markowitz's Nobel Prize-winning work on portfolio selection [3]. His work has been instrumental in constructing investment portfolios that exhibit a pre-determined risk-return behavior. In that context, he expressed the interest of the investors as hoping to achieve the lowest risk, i.e., lowest standard deviation, for a desired expected return on investment. In other words, his formulation tries to identify asset allocations that exhibit minimum variance for a desired average/expected return. This objective can be formalized mathematically through the well-studied quadratic programming problem, where a quadratic objective function is optimized subject to linear constraints. We do not seek credit for any of the mathematical formulations and/or developments of investment optimization or quadratic programming, which have been exhaustively studied in economics literature. On the other hand, we are unaware of any other works that apply these ideas to delivery networks and specifically questions of delay and jitter. We refer interested readers to [4] and [2] for a short history of the development of Modern Portfolio Theory, as well as the mathematical derivations and consequences of the theory. The namesake "diversity routing" has been chosen to draw parallels to diversification of financial investments.

The rest of this description is organized as follows: Section 2 introduces the general model under which diversity routing is considered. Section 3 casts the optimal allocation of traffic as a convex quadratic optimization problem, and Section 4 describes the solution space. Section 5 describes our solution. Section 6 adds consideration of an optional independent jitter-ree path. Section 7 discusses theoretical limits of diversification. Section 8 incorporates additional cost criteria into the optimization framework. Section 9 extends our results to general transportation networks. Discussion of our contributions as well as future works is given in Section 9. Concluding remarks are provided in Section 10.

2. General Model

FIG. 1 is a schematic block diagram of a network management and control (NMC) system 100 that monitors the state of a network at all layers, reconfigures network resources when necessary and provides data and instructions to applications upon request. More specifically, when an application requires network resources, the application contacts the NMC system 100 and specifies its requirements, including delay, jitter and bandwidth. It is preferable for the application to specify a few possible variations of its desirable requirements, each corresponding to a different QoS and/or Quality of Experience (QoE) level. The NMC system 100 in turn evaluates the feasibility of the requests and responds by specifying the routes that should be used to achieve the highest possible QoS and/or QoE levels. If the network, in its current state, is unable to satisfy the application's demand, the NMC system 100 either reconfigures the network to meet the requirements or rejects the request.

FIG. 1 schematically illustrates roles and responsibilities of the NMC system 100, including: determining feasibility of application requests 102, advising the application of operational requirements 104, and reconfiguring network resources 106.

We should acknowledge that in current systems, the network is often unaware of the user's specific QoS requirements, except for some limited software-defined network (SDN) services. Our proposal requires a deliberate negotiation between the user and the NMC system 100 to convey such requirements in order to achieve better efficiency and performance. We would like to be clear that our decision to take this unconventional approach is a conscious trade-off. The following discussion exemplifies this process in the context of routing computer/communication network packets with delay and jitter requirements. However, as noted, these principles apply to other transportation and other networks, as exemplified herein.

Figure 2:
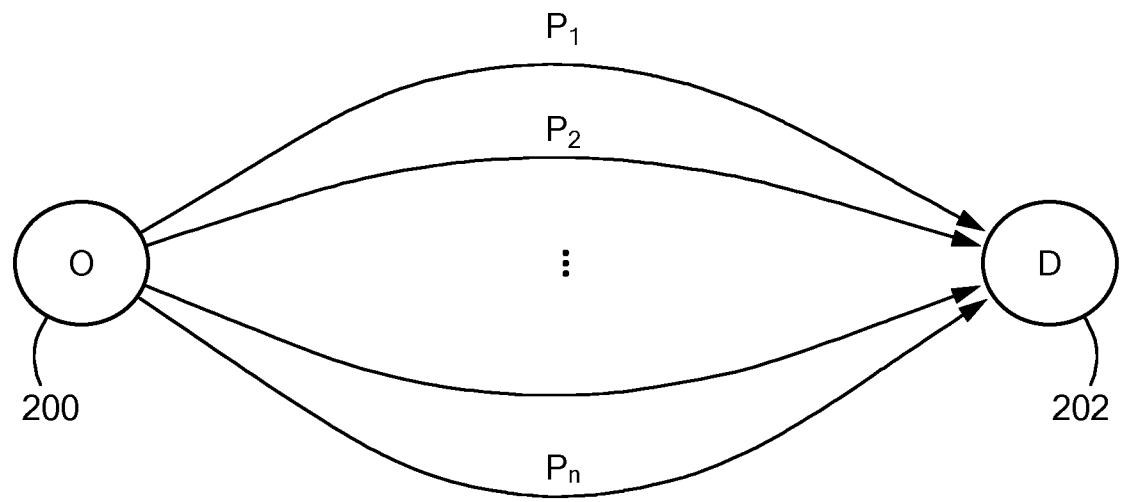
FIG. 2 is a schematic diagram of a hypothetical exemplary origin-destination (OD) pair of network nodes connected via n paths, according to an embodiment of the present invention.

Let us suppose that an origin-destination (OD) pair of nodes 200 and 202 is connected via n paths $P_1, \ldots, P_n$ as shown schematically in FIG. 2. Based on information available to the NMC system 100, packets transmitted on path $P_i$ will experience a delay $d_i$, where $d_i$ is a random variable with known mean and variance denoted by $\mu_i = \mathbb{E}[d_i], \sigma_i^2 = \text{Var}[d_i]$. Recall that jitter is defined as the standard deviation of delay, and thus $\sigma_i$, denotes the jitter on path $P_i$.

Figure 3:
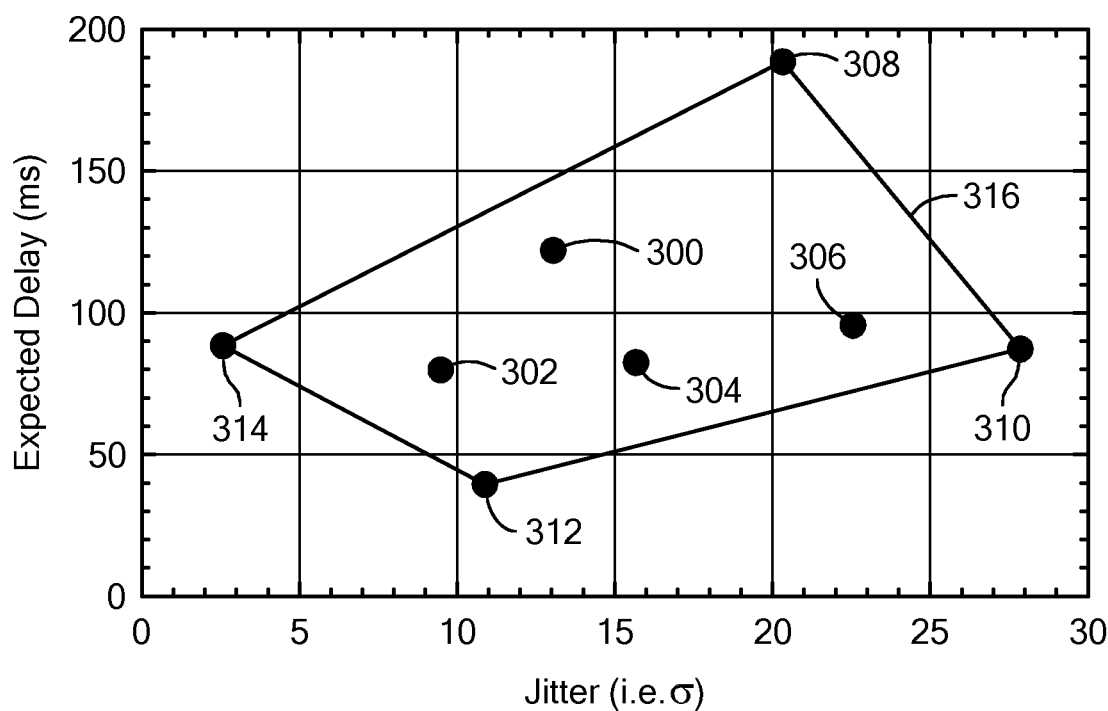
FIG. 3 is a graph depicting mean delay and jitter values for a hypothetical exemplary set of paths between an OD pair of network nodes, as well as a convex hull defined by these values, according to an embodiment of the present invention.

With this description, each path $P_i$ connecting the OD pair 200, 202 can be visualized as a point on a Cartesian plane, if we use its mean delay and jitter as its corresponding coordinates. FIG. 3 schematically illustrates a relationship between a few hypothetical exemplary paths and their respective mean delay and jitter values 300, 302, 304, 306, 308, 310, 312 and 314, as well as a convex hull 316 defined by these values. Clearly, applications that utilize this network for data transport are affected by the delay performance of its individual paths. But, can the network as a whole provide delay characteristics that outperform the convex hull 316 defined by individual path characteristics? The following section demonstrates how diversity routing enables applications to meet delay/jitter requirements that exceed the performance of individual paths, as well as the performance of the convex hull 316 defined by their performances.

Before concluding this section, we should note that, in general, the delays incurred on these paths are not independent. In what follows, we use $\sigma_{i,j}$ to denote a covariance between delays on paths $P_i$ and $P_j$, i.e. $\sigma_{i,j} = \text{Cov}(d_i, d_j)$. Hence we can denote the covariance among the n paths with a matrix as:

$$\Sigma = \begin{pmatrix} \sigma_1^2 & \sigma_{1,2} & \cdots & \sigma_{1,n} \\ \sigma_{2,1} & \sigma_2^2 & \cdots & \sigma_{2,n} \\ \vdots & \vdots & \ddots & \vdots \\ \sigma_{n,1} & \sigma_{n,2} & \cdots & \sigma_n^2 \end{pmatrix} \quad (1)$$

Accounting for this covariance relaxes an assumption used in many queuing theory text books, known as the Kleinrock Independence Approximation.

3. Optimal Traffic Allocation

4. Formulation

Consider a routing algorithm that assigns a fraction $f_i$ of the total (from O to D) flow to path $P_i$. Let us use F and $\mu$ to denote a vector of fractions and a vector of mean delays, respectively;

$$F = \begin{pmatrix} f_1 \\ f_2 \\ \vdots \\ f_n \end{pmatrix}, \quad \mu = \begin{pmatrix} \mu_1 \\ \mu_2 \\ \vdots \\ \mu_n \end{pmatrix} \quad (2)$$

Note that each vector F corresponds to a unique traffic allocation. The mean and variance of delay for a given traffic allocation can be computed as:

$$\mathbb{E}[d_{TA}] = \mathbb{E}[\Sigma_{j=1}^n f_j d_j] = \Sigma_{j=1}^n f_j \mu_j = F^T \mu \quad (3)$$

$$\operatorname{Var}[d_{TA}] = \Sigma_{i=1}^n \Sigma_{j=1}^n f_i f_j \operatorname{Cov}(d_i, d_j) = F^T \Sigma F \quad (4)$$

Given the aforementioned quantities, we define an "optimal" traffic allocation as one that minimizes expected delay or jitter, or a combination of them. Since we expect linear operation, the expected delay of the allocation is simply the weighted linear combination of individual mean delays and is thus minimized if the entire traffic is allocated to the path with the lowest expected delay. On the other hand, variance of delay is a quadratic function of the traffic allocation F, and the allocation that minimizes jitter depends on the covariance matrix $\Sigma$. One way to incorporate both criteria into an optimization framework is to find the minimum jitter allocation that achieves a pre-specified expected delay, $\mu^*$. Noting that jitter is minimized when $\operatorname{Var}[d_{TA}]$ is minimized, the optimization can be written as:

$$\begin{aligned}
& \underset{F}{\text{minimize}} & & F^T \Sigma F \\
& \text{subject to} & & \\
& & & e^T F = 1 \\
& & & F^T \mu = \mu^* \\
& & & 0 \le f_i \le 1, \quad i = 1, \ldots, n
\end{aligned} \quad (5)$$

where e denotes a vector of all ones, and the constraint $e^T F = 1$ ensures that fractional flows sum-up to one.

Algorithmically speaking, the application may specify a pair of numbers ($\mu^*, \sigma^*$) to the NMC system 100, representing the maximum acceptable average delay and jitter, respectively. The NMC system 100 evaluates 102 the aforementioned optimization to determine feasibility of the request. If a feasible traffic allocation exists, the application's request is accepted, and the NMC system 100 provides 104 the application with appropriate routing information by recommending a specific traffic allocation among the paths. If the request is infeasible, the NMC system 100 either rejects 104 the application's request or reconfigures 106 the network in such a way to accommodate the original request. Network reconfiguration tactics are outside the scope of this work. However, one example of network reconfiguration to increase bandwidth involves illuminating an additional wavelength in a wavelength-division multiplexed (WDM) communication system. See, for example, U.S. Pat. Nos. 10,256,939 and 10,050,740, both titled "Scheduled Light Path Switching in Optical Networks and Automatic Assessment of Traffic Impairments that would result from Adding or Deleting a Channel in a Wavelength-Division Multiplexed Optical Communication Network," the entire contents of which are hereby incorporated by reference herein, for all purposes.

5. Solution

The investigation of minimum variance allocations for a desired average performance, as expressed above, was originally proposed by Markowitz in the context of portfolio theory and allocation of financial assets [5]. In that context, he expressed the goal of rational investors as hoping to allocate/invest their assets in such a way as to achieve the lowest risk, i.e., lowest standard deviation, for a desired expected return on investments. In a similar manner, we wish to identify a traffic allocation that achieves the lowest jitter for a desired expected delay. However, it should be noted that nothing in Markowitz's original work teaches or suggests applying minimum variance allocation analyses to transport networks. Furthermore, aspects of Markowitz's work are inconsistent with our analyses and transport networks.

Figure 4:
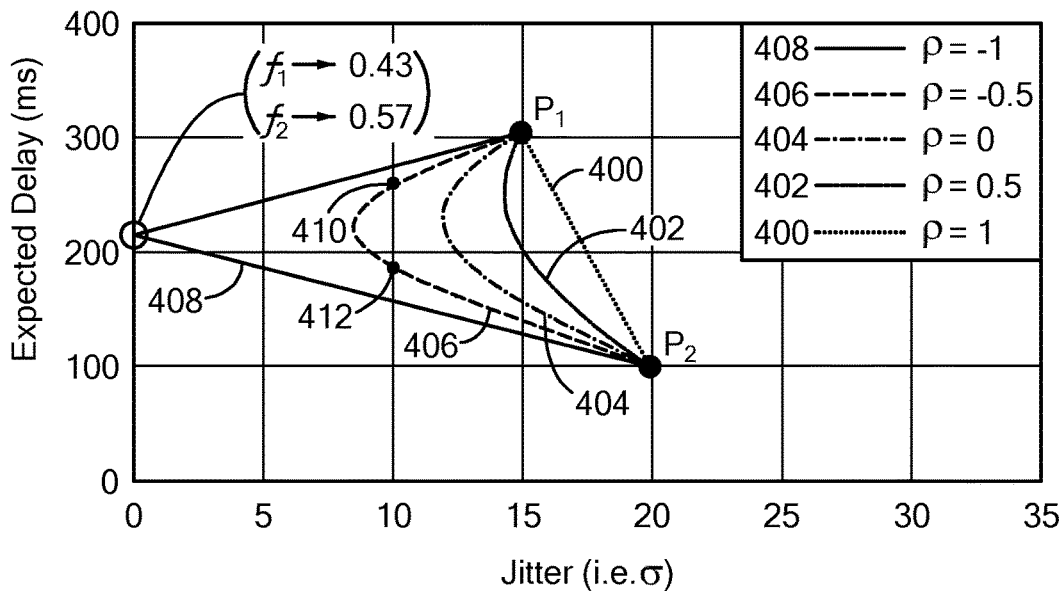
FIG. 4 is a graph of achievable delay-jitter combinations using diversity routing for various correlation coefficients for two hypothetical exemplary paths connecting a hypothetical exemplary OD pair of network nodes, according to an embodiment of the present invention.

Before getting into the details of the optimization, let us consider the simplest possible setting, whereby an OD pair 200, 202 (FIG. 2) is connected via exactly two paths. Let us visualize the expected delay and jitter characteristics of each path as a respective point on the Cartesian plane, as shown in FIG. 4. FIG. 4 is a graph of hypothetical exemplary achievable delay-jitter combinations using diversity routing for various correlation coefficients ($\rho$) for an OD pair 200, 202 (FIG. 2) connected via two paths $P_1$ and $P_2$.

Numbers of paths, path delays, jitter values, etc. for hypothetical exemplary networks are provided purely to facilitate explaining our system. For example, a first path, $P_1$, may have a mean delay of 300 ms and jitter of 15 ms, while a second path, $P_2$, may have a mean delay of 100 ms and a jitter of 20 ms. In this case, our traffic allocation vector is $F = (f_1, f_2)^T$, where $f_2 = 1 - f_1$. Hence, we can determine performance of all traffic allocations by sweeping the $f_1$ parameter between 0 and 1. Each line 400, 402, 404, 406 and 408 in FIG. 4 traces a set of achievable mean delay and jitter value combinations for a specific correlation coefficient $\rho$. Note that by transmitting through both paths we can obtain an overall jitter that is significantly lower than the jitter afforded by either of the individual paths. In particular, if the delays on the two paths are perfectly anti-correlated, i.e. $\rho = -1$, there exists a traffic allocation that can achieve jitter-free performance. For our example, this jitter-free point occurs in our hypothetical example when traffic allocation fractions are chosen to be $(f_1, f_2) = (0.43, 0.57)$.

Figure 5:
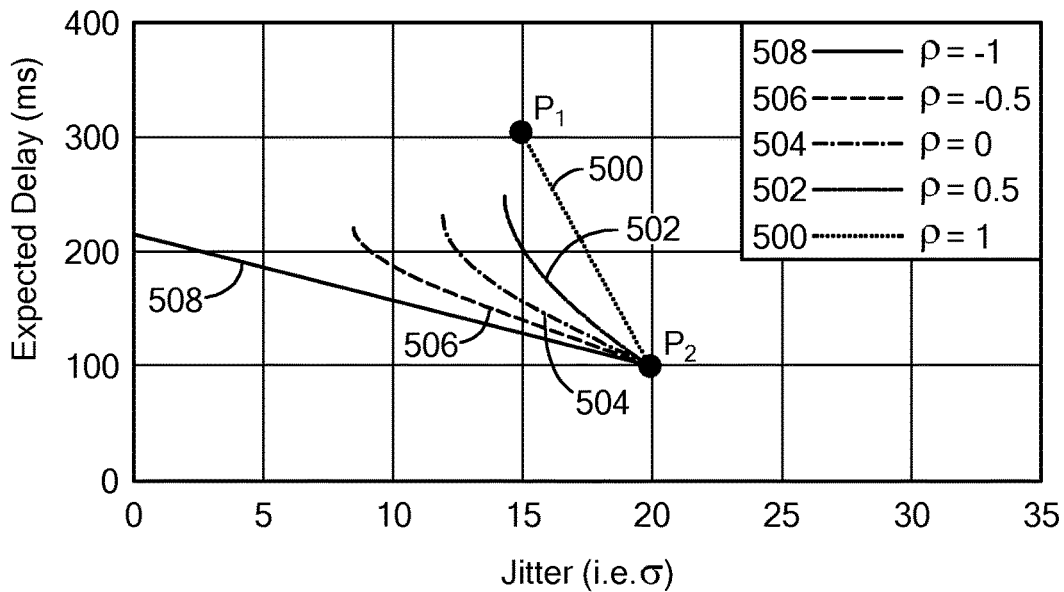
FIG. 5 is a graph of various efficient allocations of traffic between the two hypothetical exemplary paths of FIG. 4, according to an embodiment of the present invention.

We should also note that a particular jitter requirement can be satisfied at two different mean delays, corresponding to two different traffic allocations. In the absence of additional selection criteria, we should always choose the traffic allocation that has a smaller mean delay. Thus, in the example of FIG. 4, we should choose point 412 over point 410. In other words, we will always be interested in the bottom portion of the delay jitter traces. The set of traffic allocations that constitute the bottom portions of the curves is referred to herein as a set of "efficient allocations," following a similar naming convention in [5]. FIG. 5 depicts efficient allocations 500, 502, 504, 506, and 508 corresponding to the previously discussed case (FIG. 4) of an OD pair connected via exactly two paths $P_1$ and $P_2$.

Figure 6:
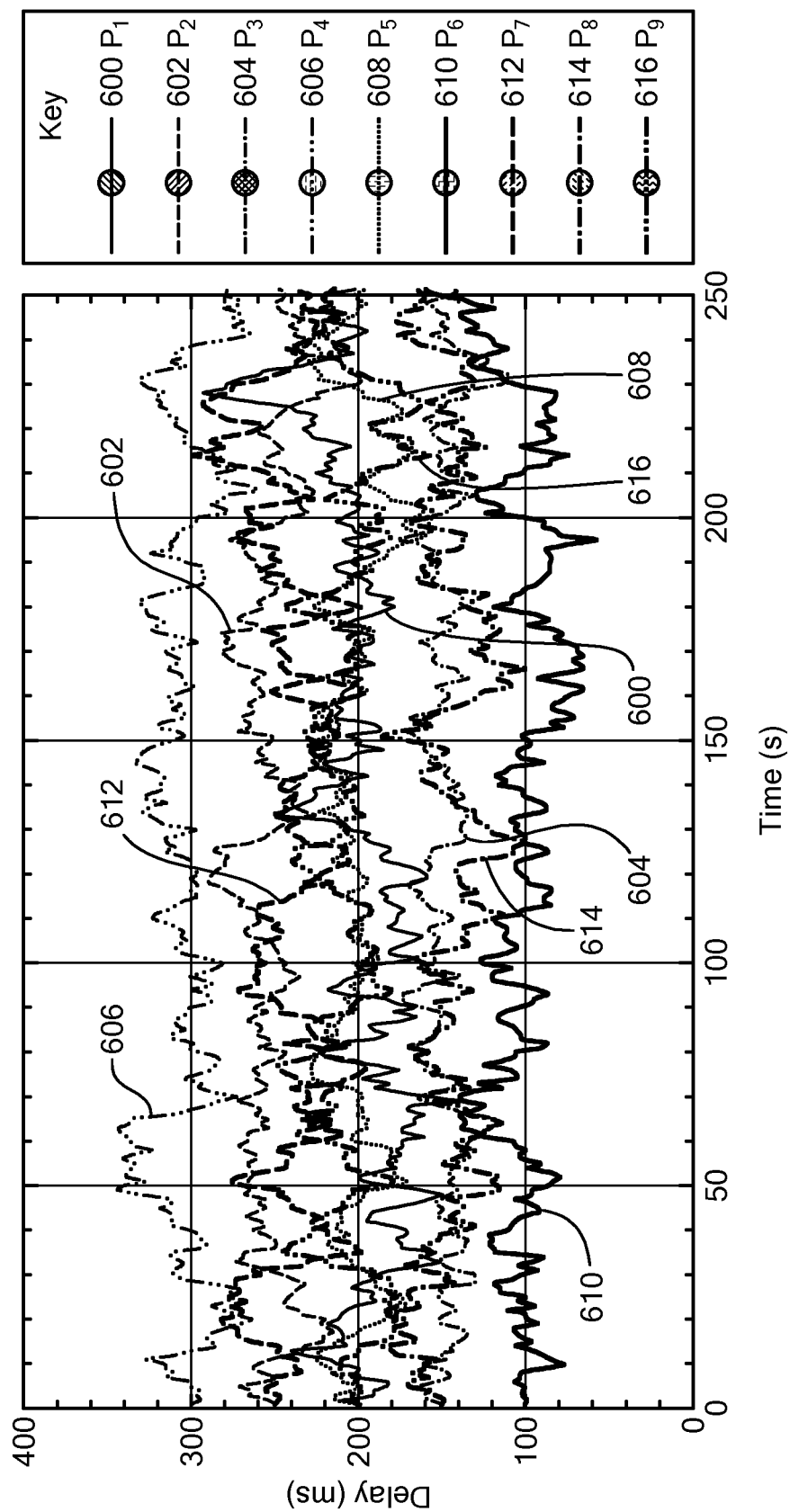
FIG. 6 is a graph of delay over time for nine hypothetical exemplary paths between a hypothetical exemplary OD pair of network nodes, according to an embodiment of the present invention.
Figure 7:
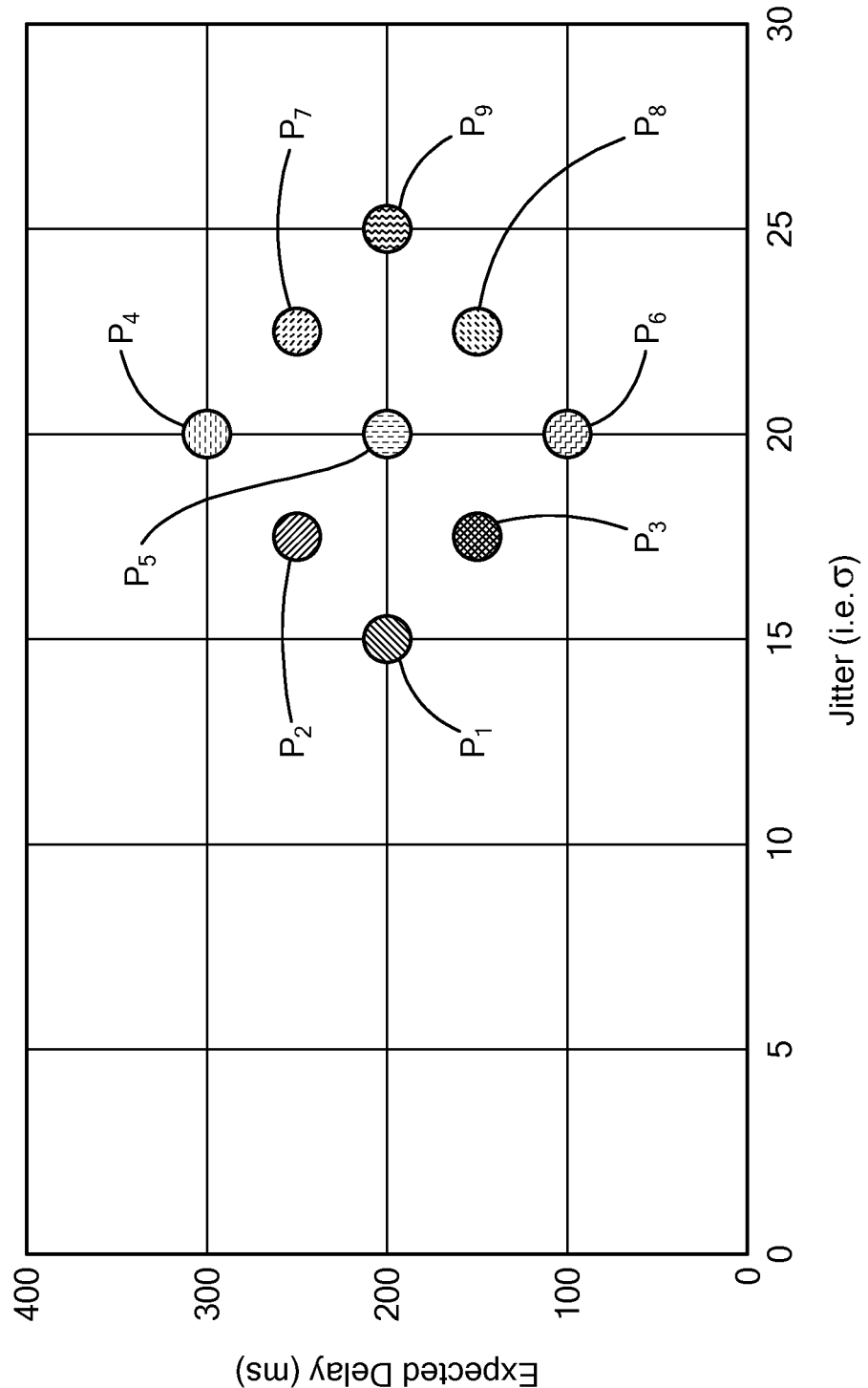
FIG. 7 is graph of expected mean delay versus jitter (delay performance) for the nine hypothetical exemplary paths of FIG. 6, according to an embodiment of the present invention.

Fortunately, the same basic behavior is observed when the number of paths increases, as shown in the following simulated scenario. Suppose that the NMC system 100 has observed instantaneous delays corresponding to nine paths that connect a particular OD pair 200, 202 over a long period of time. FIG. 6 is a graph of delays over a simulated 250 second period of time for a set of nine correlated random processes, whose mean and standard deviation, i.e. jitter, are schematically illustrated as a grid in FIG. 7. Traces 600, 602, 604, 606, 608, 610, 612, 614 and 616 in FIG. 6 are coded to match the corresponding points on the grid in FIG. 7. More specifically, these sample paths were drawn from a set of correlated Ornstein-Uhlenbeck processes with pre-specified mean delay and jitter and are good candidates for our demonstration purposes.

Figure 8:
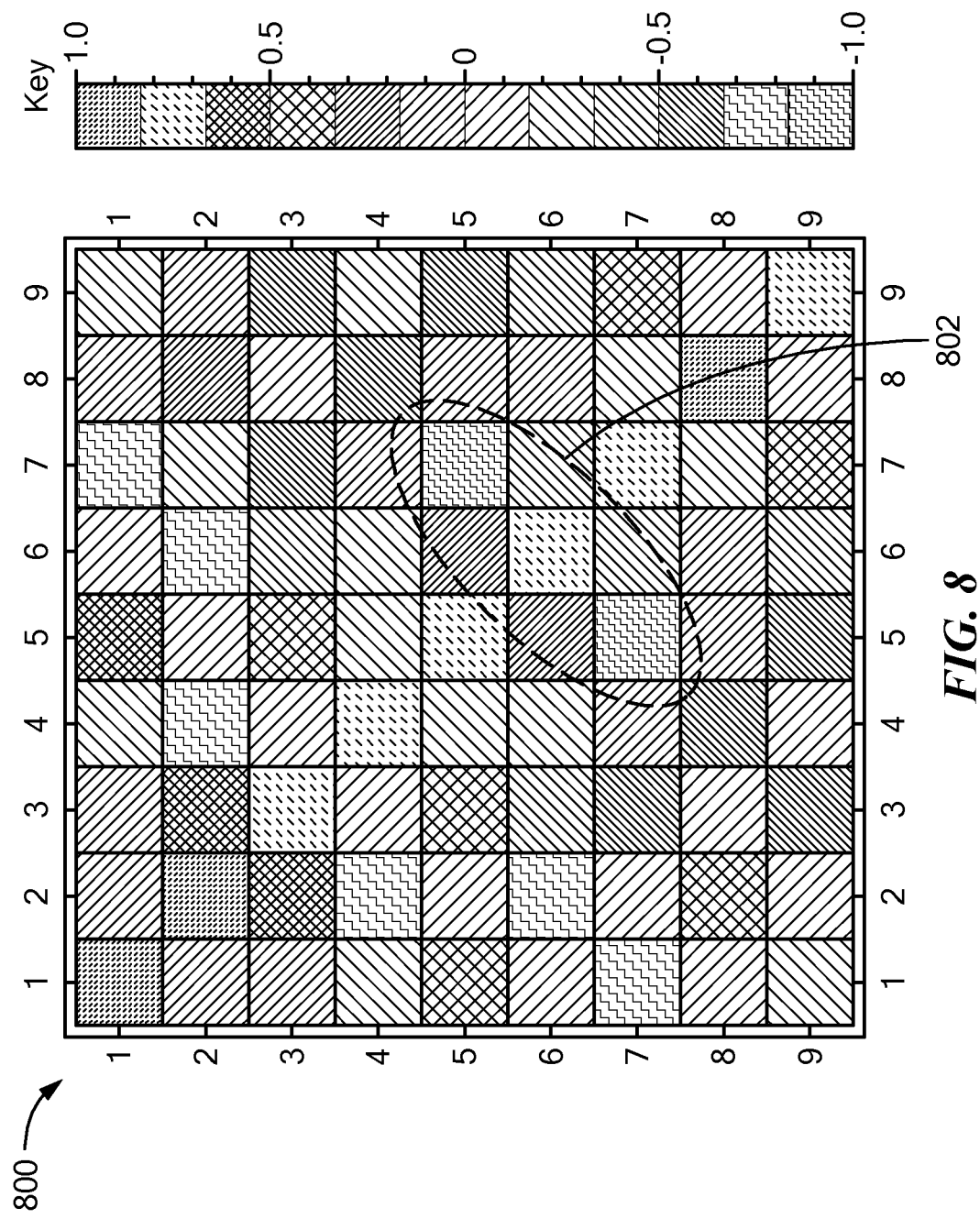
FIG. 8 is a correlation matrix corresponding to delay observations of the nine hypothetical exemplary paths of FIGS. 6 and 7, according to an embodiment of the present invention.

Given these observations, the NMC system 100 can readily compute the corresponding correlation matrix, or equivalently the covariance matrix. A computed correlation matrix 800 for this specific example is depicted in FIG. 8.

We can then numerically solve the following convex optimization problem, for all feasible values of $\mu^*$. Feasible values of $\mu^*$ are those that fall between the minimum mean-delay and the maximum mean-delay of the nine paths, i.e. between 100-300 ms in the present example:

$$\begin{aligned}
& \underset{F}{\text{minimize}} && (6) \\
& \text{subject to} \\
& F^T \sum F \\
& e^T F = 1 \\
& F^T \mu = \mu^* \\
& 0 \leq f_i \leq 1, \quad i = 1, \ldots, n.
\end{aligned}$$

Figure 9:
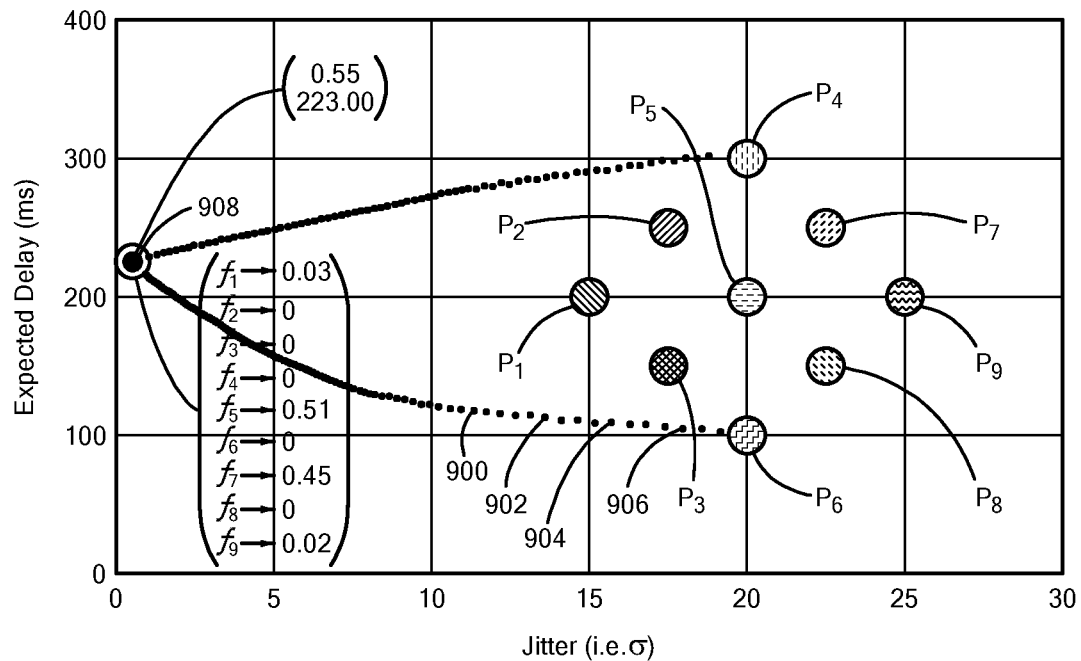
FIG. 9 is a graph of optimal delay jitter combinations and characteristics of the original nine hypothetical exemplary paths of FIGS. 6-8, according to an embodiment of the present invention.

FIG. 9 depicts a solution of the aforementioned optimization for all feasible expected delays. Once again, nine coded dots $P_1$-$P_9$ on the right-hand side of the figure represent the mean delay and jitter of each of the individual paths. Each point on the left, exemplified by points 900, 902, 904 and 906, represents a specific traffic allocation vector and the resulting mean delay and jitter. Note that the points 900-906 present a significantly reduced jitter, in comparison to the original paths $P_1$-$P_9$. Finally, a dot 908 corresponds to the "minimum-jitter allocation." The network cannot support an application that requires more stringent jitter than that afforded by the allocation corresponding to the dot 908. As shown in the figure, the minimum-jitter allocation sends most of its traffic through paths $P_5$ and $P_7$, as denoted by $f_5$=0.51, $f_7$=0.45.

Insight into the minimum-jitter allocation can be gained by referring to the significant negative correlation between paths $P_5$ and $P_7$, as illustrated in FIG. 8 at 802 overall jitter is reduced when a flow is split amongst negatively correlated paths. Negative correlations can arise in many situations in real networks. One such instance is exemplified by an Autonomous System (AS) that competes for traffic share by advertising different costs to a given destination. When an AS advertises a cheaper route, it attracts traffic from other ASs. Thus, an increase in traffic flowing to the advertising AS is often accompanied by a decrease in traffic to the other ASs and occurs at about the same time, resulting in negatively correlated delay on the respective paths. Another example is caused by the cyclical nature of traffic demand, which corresponds to time of day. Consequently, geographical areas that are offset by certain time differences tend to exhibit negatively correlated behaviors. We shall wrap up this section by reiterating that the lower half of the plot corresponds to efficient allocations.

6. Incorporating an Independent Jitter-Free Path

One way to avoid jitter is to utilize a dedicated path between an OD pair 200, 202. If the packet arrival rate into this path is constant, and the path is not shared with other users, we expect the path to exhibit a constant delay for all packets. In other words, this path acts as a static pipe that delivers every packet to its destination node after a fixed and deterministic amount of time. A circuit switched architectures is an example of a jitter-free communication link. In such a network, once a circuit is established, the circuit is dedicated to carrying information between a specific OD pair, and the circuit provides a fixed-delay and jitter-free path between the OD pair.

Figure 10:
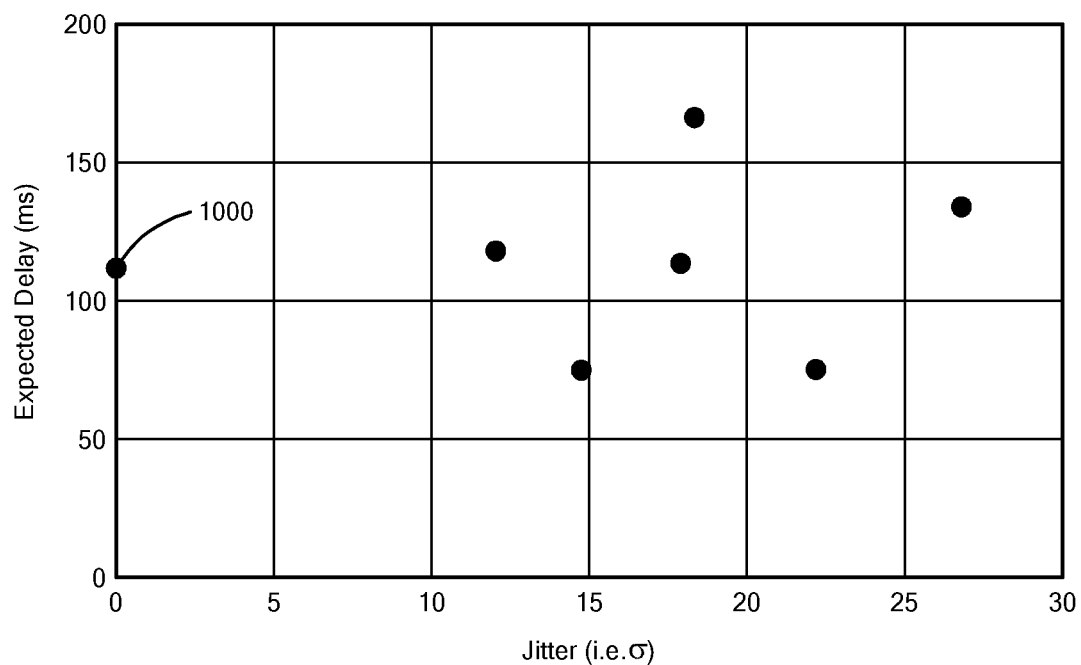
FIG. 10 is a graph of mean delay versus jitter for a subset of the nine hypothetical exemplary paths, plus an independent, jitter-free path, according to an embodiment of the present invention.

In this section, we discuss how the presence of such an independent, or uncorrelated, jitter-free path fits into our diversity routing framework. For simplicity, let us assume that the OD pair 200, 202 is connected via n paths, one of which is jitter-free and independent of the others. FIG. 10 depicts such a scenario, in which the jitter-free path is denoted by a dot 1000 on the vertical axis. It is important to note that there is a fundamental limit on the minimum expected delay of any path. In a communication network, this limit is governed by the physical length of this path and the speed of light in that medium.

Figure 11:
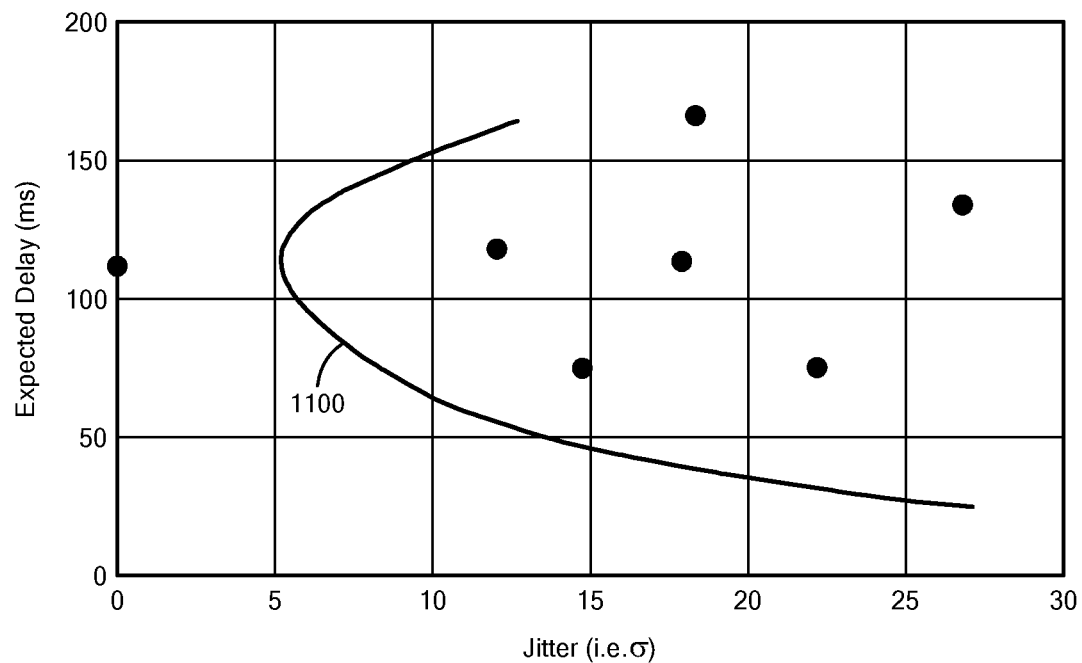
FIG. 11 is a graph of optimal delay jitter combinations when the jitter-free path of FIG. 10 is excluded, according to an embodiment of the present invention.

Let us consider the set of optimal traffic allocations that are achievable by utilizing every path except the jitter-free path 1000. This set is illustrated as a curve 1100 in FIG. 11.

Figure 12:
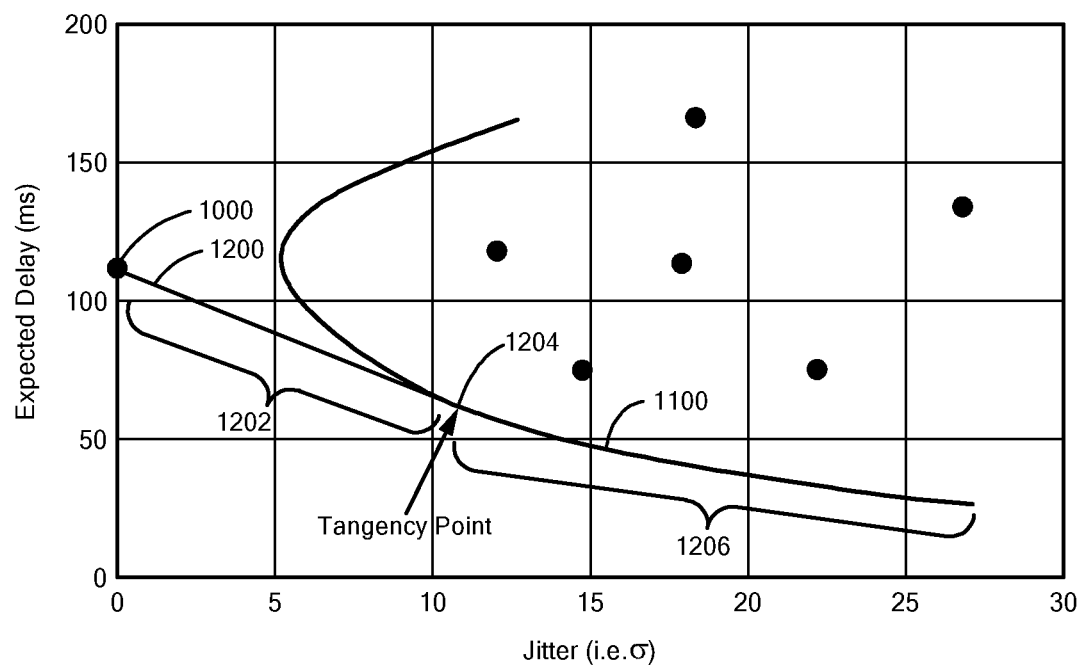
FIG. 12 is a graph of optimal delay jitter combinations when the jitter-free path of FIG. 10 is included, according to an embodiment of the present invention.
Figure 13:
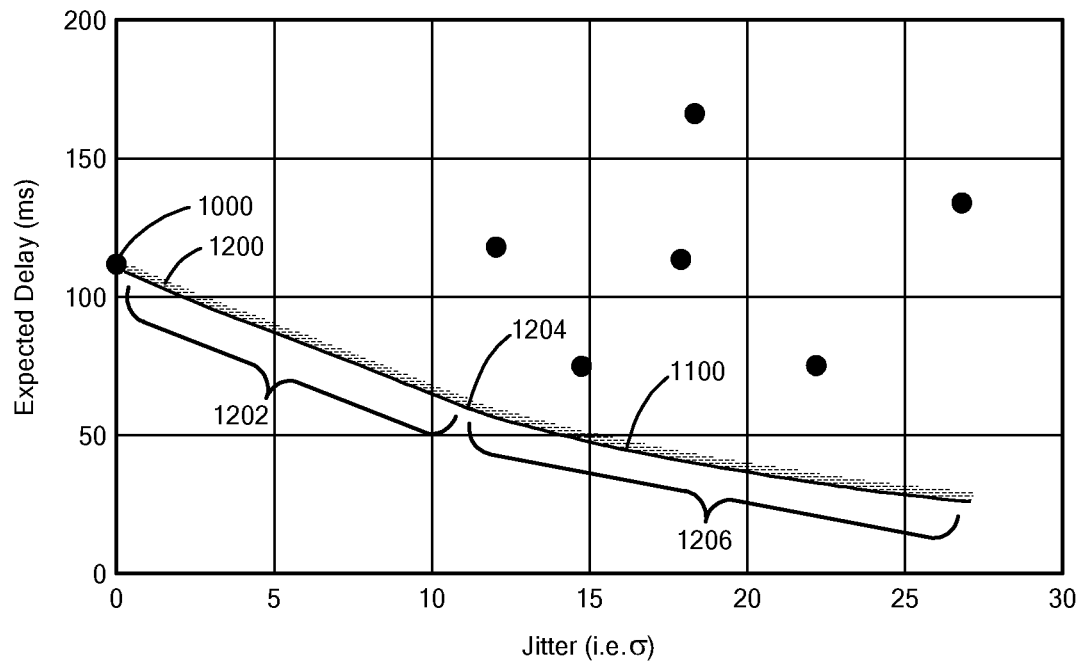
FIG. 13 is a graph of a hypothetical exemplary expanded set of efficient allocations that provide optimal delay jitter combinations, according to an embodiment of the present invention.

Recall that our discussion has been focused on a jitter-free path whose delay performance is independent of all other paths. As a result, the delay-jitter performance of any "optimal" diversity routing scheme that incorporates a jitter-free path is a linear combination of some point on the curve 1100 and the point 1000 corresponding to the jitter-free path. Not surprisingly, incorporating the jitter-free path 1000 enables us to improve the set of efficient allocations. The best way to visualize the delay-jitter performance of such traffic allocations is by drawing a line 1200 that starts from the point 1000 and is tangent to the portion of the curve 1100 corresponding to the original efficient allocations, as shown in FIG. 12. We can identify the performance of this expanded set of efficient allocation by choosing the minimum point amongst all available combinations of the plot. This is depicted in FIG. 13. Note that this expanded efficient allocation has two segments, a linear segment 1202 extending from the point 1000 to the tangency point 1204, and a secondary segment 1206 that is unaffected by the availability of the jitter free path 1000.

FIG. 12 is a graph of feasible delay jitter combinations when the jitter-free path 1000 is used in conjunction to the previous six optimal traffic allocations. FIG. 13 is a graph of an expanded set of efficient allocations.

If the jitter-free path 1000 has an expected delay that is less than or equal to the minimum expected delay of all other paths, then this path 1000 will be strictly better that any other path, and all traffic should be assigned to it. Under such singular circumstances, the curve corresponding to the set of efficient allocations exhibits a non-negative slope.

We shall conclude this section by noting that the corresponding plot in financial literature is often referred to as a risk-return spectrum, and the point corresponding to jitter-free paths denotes risk-free assets, such as short-term United States Treasury Bills. Unlike financial engineering that allows for "shorting" of an asset, in diversity routing we cannot assign negative flows to a given path. If one could assign a negative fraction of flow to a given path, the aforementioned linear segment would be extended beyond the tangent point and would remain linear! The slope of that line is often referred to as a Sharpe Ratio of the Tangency Portfolio, and denotes a "fair" linear tradeoff between the risk and return or in our case mean-delay and jitter.

While the diversity routing model does not generally result in a linear set of efficient allocations, we can still interpret the slope of the linear segment as a fundamental quantity. Ignoring the singular case discussed previously, the slope of this line is negative and has the interpretation of Expected Delay per unit of jitter and thus assigns a "fair" tradeoff between delay and jitter. Said another way, we should expect a fixed reduction in expected delay for each additional unit of jitter that we can handle, or alternatively we should expect a fixed increase in mean-delay for each unit reduction in jitter.

7. Limits to Diversification

The successful examples of the previous sections may lead us to wonder whether we could completely eliminate jitter by using diversity routing and employing additional paths. As we will see, there are limits to the diversification effect afforded to us through diversity routing. The discussions of this section will closely follow the developments of similar material in section 7.3 of [1], which showed the limits of diversification in context of Modern Portfolio Theory.

Recall the expression for the variance of a given traffic allocation, and rewrite it as:

$$\mathrm{Var}[d_{TA}] = \sum_{i=1}^{n}\sum_{j=1}^{n} f_i f_j \mathrm{Cov}(d_i, d_j) \qquad (7)$$

$$= \sum_{i=1}^{n} f_i^2 \sigma_i^2 + 2\sum_{i<j} f_i f_j \sigma_{i,j}$$

where $\sigma_{i,j}$ is the covariance between delays of path i and path j, respectively. Clearly, variance of delay in individual paths contributes n terms to the sum, while the covariances contribute approximately $n^2$ terms to the sum. This simple observation signifies the importance and contribution of covariances/correlations between various paths, which can easily outweigh the jitter of individual paths! It can be shown that the contribution of the variances can be eliminated through the introduction of additional paths, but the covariances will dominate and constitute the bulk of the remaining jitter. The following example may be used to convey the aforementioned idea. Let us consider the case of equal-splitting of the traffic amongst all n paths, i.e. $f_i=1/n$. Then:

$$\mathrm{Var}[d_{TA}] = \sum_{i=1}^{n} f_i^2 \sigma_i^2 + 2\sum_{i<j} f_i f_j \sigma_{i,j} \qquad (8)$$

$$= \sum_{i=1}^{n} \left(\frac{1}{n}\right)^2 \sigma_i^2 + 2\sum_{i<j} \left(\frac{1}{n}\right)^2 \sigma_{i,j}$$

$$= \frac{(Avg. \ Var)}{n} + \left(1 - \frac{1}{n}\right)(Avg. \ Covar)$$

Interestingly, as $n \to \infty$, the contribution of variances becomes negligible and approaches zero, and thus average covariance of delay becomes the dominant term. In other words, diversity routing reduces jitter by incorporating paths whose average delay covariance is negligible. The aforementioned analysis is the basis of the common practice that dictates "diversification reduces risk" in financial literature.

Contribution of each path to the total jitter can be quantified by rewriting the variance of delay as:

$$\mathrm{Var}[d_{TA}] = \sum_{i=1}^{n} f_i \mathrm{Cov}\left(d_i, \sum_{j=1}^{n} f_j d_j\right) \qquad (9)$$

$$= \sum_{i=1}^{n} f_i \mathrm{Cov}\left(d_i, \sum_{j=1}^{n} f_j d_j\right)$$

$$= \sum_{i=1}^{n} f_i \mathrm{Cov}(d_i, \mathbb{E}[d_{TA}])$$

which shows that the total variance is a weighted average of the covariance of delay on each path and the average delay. We conclude this section by presenting the following simple bound on the minimum achievable jitter:

$$\frac{1}{\sqrt{e^T \Sigma^{-1} e}} \le \mathrm{Minimum \ Jitter} \qquad (10)$$

This bound is derived in Appendix A and can act as a first check to determine whether an application's jitter requirements can be met or not. The NMC system 100 rejects 104 any application's request for network resources if the resources are not obtainable. Furthermore, network architects should use the aforementioned metric as a barometer to decide if network resources should be reconfigured 106, such as by adding wavelengths to increase bandwidth, rejecting lower priority traffic to make bandwidth available, etc., in order to satisfy a user demand. Last, but not least, application designers can use such metrics in their feasibility analysis before deploying their application on unknown networks.

8. Generalized Cost Function and Indifference Maps

It should come as no surprise that mean delay and jitter are not the sole criteria for path selection in diversity routing. The question becomes how can we incorporate additional cost criteria into the model? The most natural way of adding cost criteria is to realize that transmissions over different paths may have different "costs." One reason for this may be the heterogeneity of the underlying physical layer. For example, a given path may include an optical fiber, while another path may include a satellite link, each of which has a different associated actual cost. Even in homogeneous networks, where transmissions over all links have essentially the same cost, we can associate a cost with a "length" of a given path, for example corresponding to a propagation delay over the path or costs of terminating equipment at ends of the path. Clearly, a path consisting of three segments has three times the cost as a path with one segment. Last, but not least, we should recognize that real networks, e.g. the US optical fiber backbone, are often collections of independently-owned and operated subnets, often referred to as Autonomous Systems. Hence, we should expect various vendors to charge different amounts for using their respective systems. Either way, we can easily associate and incorporate the respective costs with each path.

Let us use C to denote a cost vector, whose $i^{th}$ element $c_i$ denotes the cost per unit flow over path $P_i$. We can then rewrite our original optimization problem as:

$$\underset{F}{\text{minimize}} \quad (11)$$

subject to $$C^T F + F^T \sum F$$
$$e^T F = 1$$
$$F^T \mu = \mu^*$$
$$0 \leq f_i \leq 1, \quad i = 1, \ldots, n$$

One way to interpret this new formulation is to think of a service provider that has to balance two competing goals. The first goal is to reduce transportation cost as captured by $C^T F$, and the second goal is to reduce potential loss of revenue associated with delivering lower quality of service (QoS). This loss of revenue may reflect an immediate drop in customer satisfaction or an eventual customer defection caused by subpar QoS. In effect, we have taken variance of delay, $F^T \Sigma F$, as a stand-in for this loss of revenue, reflecting our preference for lower jitter. It is clear that the formulation could be further generalized by using a convex function of $F^T \Sigma F$ as the second term of the objective function, but we shall sacrifice that generality in favor of simplicity, for now.

Figure 14:
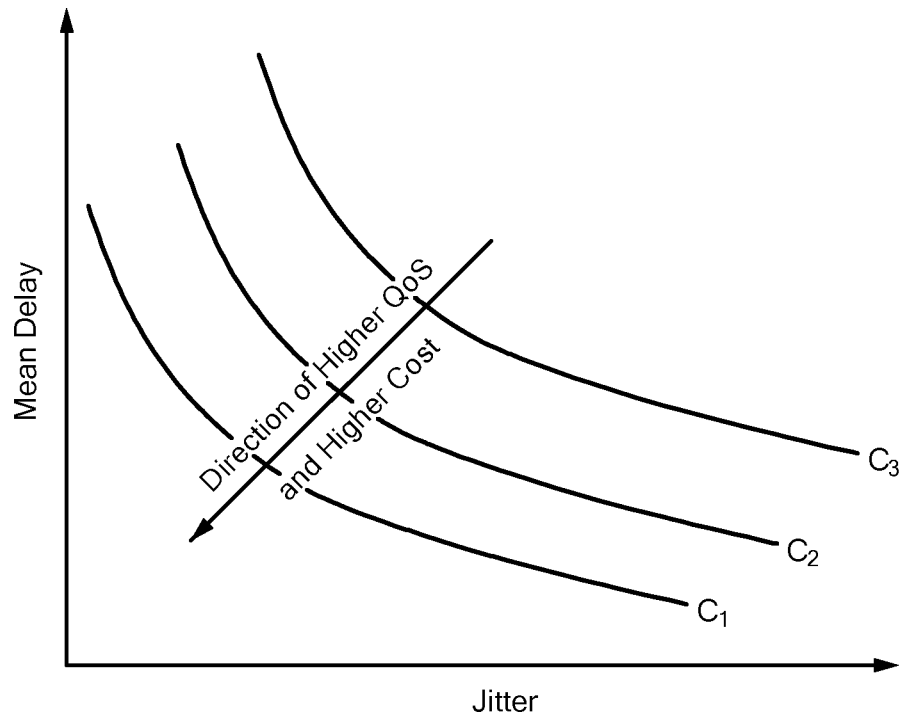
FIG. 14 is a graph showing a hypothetical exemplary set of indifference curves, each indifference curve connecting points providing the same level of utility to a user, according to an embodiment of the present invention.

Before investigating the impact of the generalized cost functions on the solution space, we shall explore how user preferences can be mapped into reasonable cost vectors. One of the best ways of visualizing such preferences is through an indifference map, an example of which is shown in FIG. 14. An indifference map is a collection of indifference curves, where a given curve connects a set of points that all provide the same level of utility to users. As a result, it is reasonable to assume that users would be willing to incur the same cost for points on an indifference curve. FIG. 14 is a hypothetical exemplary potential indifference map for delay-jitter combinations. Note that the utility and cost increase as we move to the bottom-left corner of the plot and thus $c_1 \geq c_2 \geq c_3$.

For our purposes, it is clear that users would always prefer lower mean delay and jitter over higher ones and hence they would be willing to pay a higher cost as we move to the bottom-left corner of the indifference map shown in FIG. 14. On the other hand, users may be willing to trade a slightly higher mean delay for lower jitter, or alternatively slightly higher jitter for lower mean delay, and thus the indifference curves depicted in the FIG. 14 can be considered reasonable surfaces of equal utility and cost to users.

Figure 15:
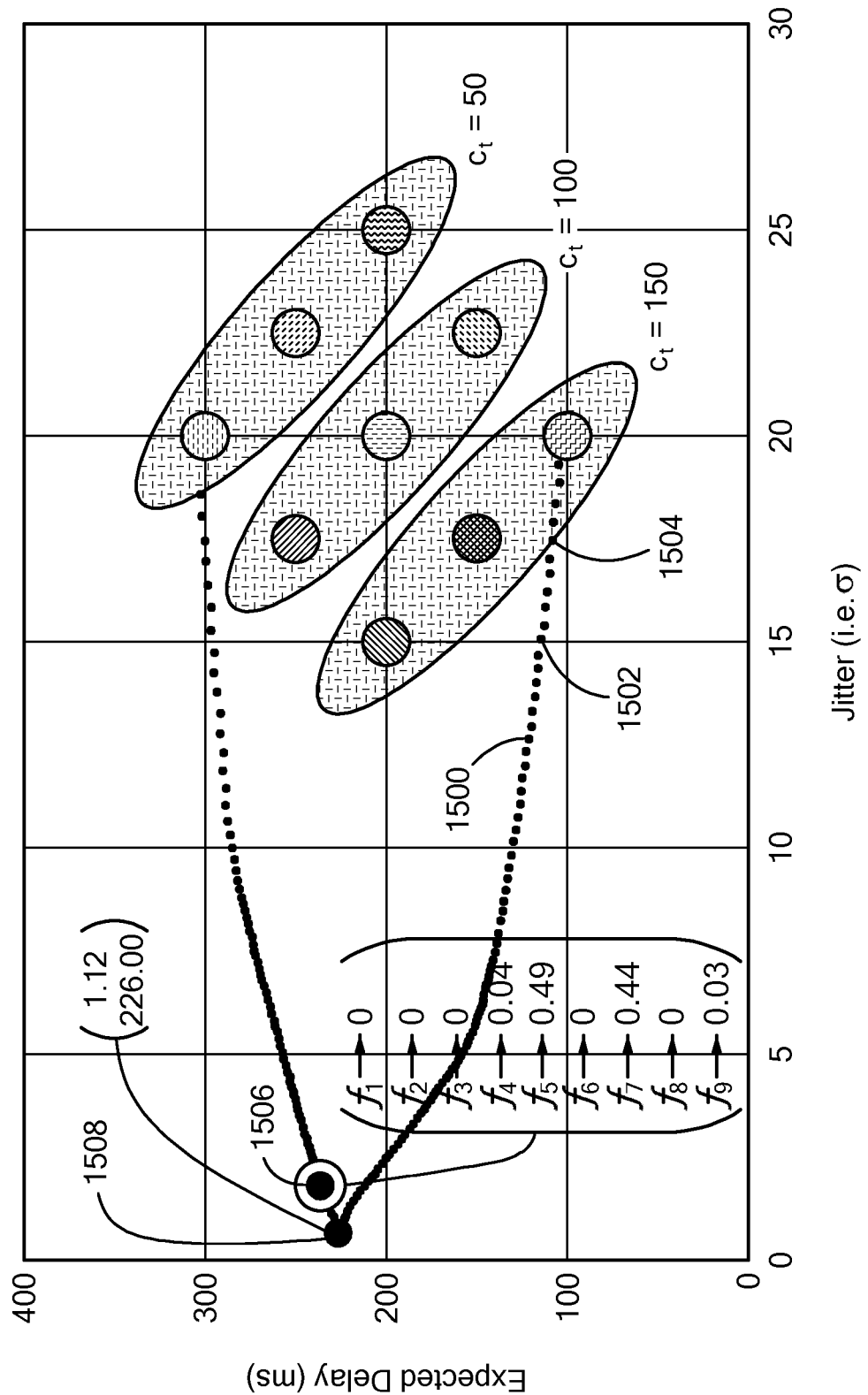
FIG. 15 is a graph of optimal delay jitter combinations, similar to that of FIG. 9, but with addition of indifference curves and regions that correspond to path costs of three hypothetical exemplary costs per unit flow, according to an embodiment of the present invention.

With this characterization in mind, let us return to the generalized optimization problem of Eq. 2. Note that this new formulation is still a convex quadratic optimization whose solution is obtained as easily as before, and hence we will refrain from additional discussion of the solution space except for the following example. Let us revisit the routing example used in section 3 and incorporate a specific cost vector C, as shown in FIG. 15. We have assigned the paths to three different cost groups, 150, 100 and 50. While the numbers were chosen arbitrarily, they reflect our previous discussion regarding increasing cost as we move towards the bottom-left corner of the plot.

FIG. 15 is a hypothetical exemplary plot of optimal delay jitter combinations, with indifference curves/regions that correspond to path costs of 150, 100, and 50 per unit flow.

Once again, each dot, exemplified by dots 1500, 1502 and 1504, represents an "optimal" traffic allocations for its corresponding value of expected delay, with the caveat that the minimum-cost allocation represented by dot 1506 is no longer the leftmost point 1508 on the plot. The coordinates of the leftmost point 1508 are (1.12, 226). The figure also identifies the traffic allocation vector corresponding to the minimum-cost allocation 1506.

9. Generalization to Transportation Networks

Our analysis has so far focused on the importance of diversity routing in communication networks. Fortunately, our proposed mechanism can also be used to reduce uncertainty in delivery time of goods over physical transportation networks.

As an example, consider a retail store in Boston that wants to receive a steady supply of a given product from New York City. Commonly, in this scenario, the retail store would contract with a logistics and transportation company to transport the products from New York City to Boston. If the logistics company uses one mode of transportation, e.g. trucks, the exact delivery time can be impacted by often unpredictable road conditions. On the other hand, if multiple modes of transportation, such as air, sea, railroad, etc., are used, the uncertainty in the delivery time of the products can be minimized. It is important to recognize that this improvement is due to the fact that different modes of transportation are affected by different factors, and thus conditions that impact one mode of transportation are often different from those that impact another. For example, a road accident is unlikely to be related to conditions of shipping lanes. By accounting for the correlation of delay on various modes of transportation, or various roads, the logistics company can deliver the goods on a more regular basis, i.e. with less jitter. Note that regular and steady delivery of goods can be immensely important to the retail store as well, because it eliminates the cost of excessive local storage and warehousing for the retail company. In fact, warehousing of goods at local facilities serves a similar purpose to packet buffering of communication networks.

A similar argument can be used to reduce uncertainty in other aspects of supply-chain management. For example, a company can order raw materials from multiple suppliers in such a way as to reduce uncertainty in their arrival rates, where the fraction ordered from each supplier is computed according to our formulation. We believe that our proposed method can be used to systematically achieve high-level managerial goals, which are often referred to as "just-in-time manufacturing" or "lean manufacturing." These terms refer to practices that enable a typical manufacturing plant to operate continuously, without need for significant storage of raw materials. To achieve these goals, each unit within the manufacturing plant orders only items and/or raw material that can be immediately used.

10. Discussion and Future Work

In this section we discuss some of the overarching principles which should be considered with regards to the adoption of our diversity routing mechanism. Recall that our treatment of diversity routing started with a network management and control system that has visibility to all layers. This included the ability to monitor the state and performance characteristics of various elements, as well as orchestration and resource reconfiguration capabilities. Resource reconfiguration may include tasks such as addition or removal of wavelengths on a particular fiber connection, which is currently typically carried out by human operators, but see the aforementioned U.S. Pat. Nos. 10,256,939 and 10,050,740. More importantly, the NMC system may interact with applications to identify appropriate routes that can deliver a desired level of service. This challenges conventional wisdom that networks should avoid any coordination or interaction with applications. This long-held strategy has forced a whole host of responsibilities onto end-user terminals. For example, rate control, congestion control and back-off algorithms are largely delegated to communication end-points, and the rapid growth of internet access is often attributed to this choice. This philosophy was often phrased "dumb networks are the smart choice."

We challenge this paradigm by promoting a user-centric view that expects the network to do its best to deliver a desired quality of service to a user. Of course, this approach comes at the expense of additional complexity to the network, but we believe that this added complexity is justified when it enables rapid adoption of next-generation applications. Simply put, current networking practices may impede the arrival of new applications that will constitute the next wave of innovation. Of course, introduction of additional complexity may yield diminishing returns, and thus the appropriate level of complexity should be investigated.

On a related note, we should point out that we have not addressed security issues that arise when a network interface is opened to various applications. Not surprisingly, malicious applications may leverage this ability to manipulate and/or attack the network by making requests that can result in misallocation of resource and ultimately resource exhaustion within the network.

As far back as 1998, the Internet Engineering Task Force considered use of multiple paths to achieve QoS-based routing [6]. Singh, et al. provide a detailed survey of various such routing schemes in [9], and we shall address a few major differences in our approach, versus the prior art. Most prior work concentrates on throughput maximization as its central objective, and not surprisingly using all available paths is the simplest way to achieve this goal. Furthermore, most of their analyses consider static networks as opposed to a truly dynamic network. Note that from an optimal routing perspective, static vs. dynamic is simply a matter of the precision with which network state, e.g., congestion/load, is known. Clearly, optimal decisions can be made if precise network state is known at all times. The overarching assumption in the prior art is that the network state is either fixed or varies slowly enough to ensure that underlying routing algorithms have a precise and consistent view of the network. As a result, their formulations do not account for the unavoidable uncertainty in the state of the network and overlook the fact that routing decisions should be made despite this uncertainty. In our approach, the uncertainty in delay characteristic of a link/path is captured by variance of delay on each path, denoted by $\sigma_i^2$, which can be computed from historical behavior of a given link. Another unique feature of our development is that we account for, and utilize, the correlation between various links to achieve higher quality of service. This is in contrast to traditional approaches, which disregard the presence of correlated behavior and often assume independence to achieve/design simpler operating paradigms.

Additionally, most authors employ a narrow network-centric approach in their formulations. These approaches lead network architects to attach undue value to goals that are certainly reasonable, but secondary in nature. For example, multiple-path routing is often used to achieve load balancing and avoid undesirable/intolerable oscillatory behavior in the network. But load balancing should be a byproduct of clever network design and operation and not its primary purpose. Our formulation uses a combination of factors, such as delay and jitter, as the primary design parameters and achieves a certain level of load-balancing as a byproduct of our solution.

Last, but not least, we should mention that communication networks can suffer from out-of-order packet delivery associated with multiple-path routing. It suffices to say that resequencing of packets can be handled separately and in fact error correcting codes can be utilized to significantly reduce the effects of out-of-order packet delivery.

10. Conclusion

We introduced a new mechanism for efficient allocation of traffic across a diversified set of paths. This allocation allows the network to deliver customizable quality of service to different users and reduces the need for buffers at various network elements. Our work focused on the tradeoff between mean delay and jitter as the main contributors to QoS. An important feature of this approach is its ability to achieve the desired QoS despite the relative uncertainty about the state of the network. Noting that the introduction of demanding, and data hungry, applications often outpace that of network upgrades, we have argued that our innovative solution can accelerate the adoption of these applications, without the need for immediate capital expenditure. We also extend our findings to general transportation and other networks and argue that this approach can significantly improve supply chain predictability and reduce the need for storage facilities.

Applicability to Electric Power Generation and/or Transmission

Furthermore, distribution of electric power via various paths, such as in a power grid, or power generation by various sources can be allocated according to the systems and methods described herein. A power transmission system provides for base load and peak load capability, with safety and fault tolerance margins. The peak load times vary by region largely due to the industry mix. In very hot and very cold climates, home air conditioning and heating loads have an effect on the overall load. These loads are typically highest in the late afternoon during the hottest part of the year, and in mid-mornings and mid-evenings during the coldest part of the year. This makes power requirements vary by season and time of day. Distribution system designs typically take the base load and the peak load into consideration.

However, the transmission system usually does not have a large buffering capability to match the loads with instantaneous generation capacity. Thus, generators have to be dynamically brought on line or off line, to keep real-time generation capacity matched to real-time load, to prevent overloading the generation equipment. Similar problems occur with respect to transmission lines, which themselves have limited capacities.

Multiple sources and loads can be connected to the transmission system, and they must be controlled to provide orderly transfer of power. In centralized power generation, only local control of generation is necessary, and it involves synchronization of the generation units, to prevent large transients and overload conditions.

Statistical Terms

In statistics, dependence or association is any statistical relationship, whether causal or not, between two random variables or bivariate data. In the broadest sense correlation is any statistical association, though it commonly refers to the degree to which a pair of variables is linearly related. Familiar examples of dependent phenomena include the correlation between the physical statures of parents and their offspring, and the correlation between the demand for a limited supply product and its price.

Correlations are useful because they can indicate a predictive relationship that can be exploited in practice. For example, an electrical utility may produce less power on a mild day based on the correlation between electricity demand and weather. In this example, there is a causal relationship, because extreme weather causes people to use more electricity for heating or cooling. However, in general, the presence of a correlation is not sufficient to infer the presence of a causal relationship, i.e., correlation does not imply causation.

Formally, random variables are dependent if they do not satisfy a mathematical property of probabilistic independence. In informal parlance, correlation is synonymous with dependence. However, when used in a technical sense, correlation refers to any of several specific types of relationship between mean values. There are several correlation coefficients, often denoted $\rho$ or $r$, measuring the degree of correlation. The most common of these is the Pearson correlation coefficient, which is sensitive only to a linear relationship between two variables, which may be present even when one variable is a nonlinear function of the other. Other correlation coefficients have been developed to be more robust than the Pearson correlation—that is, more sensitive to nonlinear relationships. Mutual information can also be applied to measure dependence between two variables.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The network management and control (NMC) system 100, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

REFERENCES

[1] R. A. Brealey, S. C. Myers, F. Allen, and P. Mohanty, *Principles of corporate finance*. Tata McGraw-Hill Education, 2012.

[2] E. Elton, M. Gruber, S. Brown, and W. Goetzmann, *Modern Portfolio Theory and Investment Analysis*. John Wiley & Sons, 2009.

[3] L. Kleinrock, *Queueing Systems Volume I. Theory*, vol. 1. New York: John Wiley & Sons, 1975.

[4] H. M. Markowitz, "The early history of portfolio theory: 1600-1960," *Financial Analysts Journal*, vol. 55, no. 4, pp. 5-16, 1999.

[5] H. Markowitz, "Portfolio selection," *The journal of finance*, vol. 7, no. 1, pp. 77-91, 1952.

[6] E. Crawley, R. Nair, B. Rajagopalan, and H. Sandick, "RFC2386: A Framework for QoS-Based Routing," *Network Working Group*, 1998.

[7] "Cisco vni: Forecast and methodology, 2016-2021," June 2017.

[8] "The zettabyte era: Trends and analysis," June 2017.

[9] S. K. Singh, T. Das, and A. Jukan, "A survey on internet multipath routing and provisioning," *IEEE Communications Surveys Tutorials*, vol. 17, pp. 2157-2175, Fourthquarter 2015.

APPENDIX FOR A

By relaxing the positivity constraints on $f_i$'s, we obtain an analytical solution to the relaxed optimization problem via a Lagrange multiplier. Let us write the Lagrangian as:

$$\mathcal{L}_{(F, \ell)} = \tfrac{1}{2} F^T \Sigma F + \ell (1 - e^T F) \quad (12)$$

which can be solved as the solution to $$\frac{\partial \mathcal{L}}{\partial f_i} = \frac{\partial \mathcal{L}}{\partial \ell} = 0.$$

where:

$$\frac{\partial \mathcal{L}}{\partial f_i} = f_i \sigma_i^2 + \sum_{j \neq i} f_j \sigma_{i,j} - \ell = 0 \quad (13)$$

rewriting the solution as a matrix gives us $\Sigma F = \ell e$ or equivalently, $F = \ell \Sigma^{-1} e$. Noting that $e^T F = 1$, we get:

$$e^T F = e^T (\ell \sum{}^{-1} e) = \ell e^T \sum{}^{-1} e = 1 \quad (14)$$

$$\ell = \frac{1}{e^T \sum^{-1} e} \quad (15)$$

which gives us the following allocation:

$$F = \frac{\sum^{-1} e}{e^T \sum^{-1} e} \quad (16)$$

Let us use U to denote this unconstrained traffic allocation. Then we have the following mean and variance for the delay:

$$\mathbb{E}[d_U] = F^T \mu = (\ell \sum{}^{-1} e)^T \mu \quad (17)$$

$$= \ell e^T (\sum{}^{-1})^T \mu = \ell e^T \sum{}^{-1} \mu = \frac{e^T \sum^{-1} \mu}{e^T \sum^{-1} e} \quad (18)$$

$$\mathrm{Var}[d_U] = F^T \sum F = F^T \ell e = \ell e^T F = \ell \quad (19)$$

Recall that we ignored the positivity constraints on $f_i$, and hence the aforementioned variance, is a lower bound to the achievable minimum variance. If we use minVar to denote the minimum achievable variance for operationally feasible traffic allocations we have:

$$\frac{1}{e^T \sum^{-1} e} \leq \mathrm{Var}[d_{minVar}] \quad (20)$$

APPENDIX B

Autonomous System—(from Wikipedia) Within the Internet, an autonomous system (AS) is a collection of connected Internet Protocol (IP) routing prefixes under the control of one or more network operators on behalf of a single administrative entity or domain that presents a common, clearly defined routing policy to the Internet.

Originally, the definition required control by a single entity, typically an Internet service provider or a very large organization with independent connections to multiple networks, that adhere to a single and clearly defined routing policy, as originally defined in RFC 1771. The newer definition in RFC 1930 came into use because multiple organizations can run Border Gateway Protocol (BGP) using private AS numbers to an ISP that connects all those organizations to the Internet. Even though there may be multiple autonomous systems supported by the ISP, the Internet only sees the routing policy of the ISP. That ISP must have an officially registered autonomous system number (ASN).

A unique ASN is allocated to each AS for use in BGP routing. AS numbers are important because the ASN uniquely identifies each network on the Internet.

Until 2007, AS numbers were defined as 16-bit integers, which allowed for a maximum of 65,536 assignments. RFC 4893 introduced 32-bit AS numbers, which the Internet Assigned Numbers Authority (IANA) has begun to allocate to regional Internet registries (RIRs), although this proposed standard has now been replaced by RFC 6793. These numbers are written preferably as simple integers (in a notation sometimes referred to as "asplain") ranging from 0 to 4,294,967,295, or in the form called "asdot" which looks like x.y, where x and y are 16-bit numbers. Numbers of the form 0.y are exactly the old 16-bit AS numbers. The accepted textual representation of autonomous system numbers is defined in RFC 5396 as "asplain." The special 16-bit ASN 23456 ("AS_TRANS") was assigned by IANA as a placeholder for 32-bit ASN values for the case when 32-bit-ASN capable routers ("new BGP speakers") send BGP messages to routers with older BGP software ("old BGP speakers") which do not understand the new 32-bit ASNs.

The first and last ASNs of the original 16-bit integers, namely 0 and 65,535, and the last ASN of the 32-bit numbers, namely 4,294,967,295 are reserved and should not be used by operators. ASNs 64,496 to 64,511 of the original 16-bit range and 65,536 to 65,551 of the 32-bit range are reserved for use in documentation by RFC 5398. ASNs 64,512 to 65,534 of the original 16-bit AS range, and 4,200,000,000 to 4,294,967,294 of the 32-bit range are reserved for Private Use by RFC 6996, meaning they can be used internally but should not be announced to the global Internet. All other ASNs are subject to assignment by IANA.

The number of unique autonomous networks in the routing system of the Internet exceeded 5000 in 1999, 30000 in late 2008, 35000 in mid-2010, 42000 in late 2012, 54000 in mid-2016 and 60000 in early 2018.

The number of allocated ASNs exceeded 84000 in early 2018.

What is claimed is:

1. A computer-implemented method for reducing delivery delay jitter in a delivery network subject to variations in delivery delay time, the method comprising:
   receiving, by a processor, an electronic request to transport traffic between an originating node of the network and a destination node of the network, the electronic request specifying a maximum acceptable mean delivery delay time and a maximum acceptable jitter in the delivery delay time;
   automatically identifying, by the processor, a plurality of routes between the originating node and the destination node, each route of the plurality of routes having a respective mean delivery delay time, the plurality of routes thereby having a plurality of values of delivery delay time, and each route of the plurality of routes having a respective delivery delay jitter;
   automatically solving, by the processor, a convex optimization problem for the plurality of values of delivery delay time, thereby yielding a plurality of solutions, wherein each solution represents a corresponding allocation of the traffic among the plurality of routes, and each allocation of the traffic has a corresponding mean delivery delay time and a corresponding mean delivery delay jitter;
   automatically selecting, by the processor, from the plurality of solutions, a selected solution, wherein the selected solution has a mean delivery delay jitter less than the delivery delay jitter of any route of the plurality of routes; and
   distributing the traffic over the plurality of routes according to the allocation of traffic that corresponds to the selected solution.

2. A computer-implemented method according to claim 1, wherein the network comprises a computer network and the traffic comprises computer network packets.

3. A computer-implemented method according to claim 1, wherein the traffic comprises physical goods and the network comprises a cargo transportation network that physically transports the physical goods.

4. A computer-implemented method according to claim 1, wherein:
   the network comprises a plurality of suppliers of a good and/or service;
   each route corresponds to a respective one of the plurality of suppliers of the good and/or service;
   each mean delivery delay time corresponds to a mean delivery delay time to supply the good and/or service by a respective one of the plurality of suppliers of the good and/or service;
   each jitter in the delivery delay time corresponds to a reputation of a respective one of the plurality of suppliers of the good and/or service; and
   the allocation of the traffic among the plurality of routes corresponds to an allocation of orders among the plurality of suppliers of the good and/or service.

5. A computer-implemented method according to claim 1, wherein the network comprises an electric power distribution system, and the traffic comprises electricity distributed via the network.

6. A computer-implemented method according to claim 1, further comprising:
   automatically ascertaining, by the processor, feasibility of satisfying the request, based at least in part on available routes in the network;
   wherein automatically identifying the plurality of routes comprises automatically identifying the plurality of routes only if satisfying the request is found by the processor to be feasible.

7. A computer-implemented method according to claim 6, wherein automatically ascertaining feasibility of satisfying the request comprises automatically ascertaining, by the processor, feasibility of satisfying the request based at least in part on the specified maximum acceptable mean delivery delay time.

8. A computer-implemented method according to claim 6, wherein automatically ascertaining feasibility of satisfying the request comprises automatically ascertaining, by the processor, feasibility of satisfying the request based at least in part on the specified maximum acceptable jitter in the delivery delay.

9. A computer-implemented method according to claim 6, wherein automatically ascertaining feasibility of satisfying the request comprises automatically ascertaining, by the processor, feasibility of satisfying the request based at least in part on the specified maximum acceptable mean delivery delay and based at least in part on the specified maximum acceptable jitter in the delivery delay.

10. A computer-implemented method according to claim 1, wherein the plurality of values of delivery delay time extends from a minimum mean delivery delay time and to a maximum mean delivery delay time of the plurality of routes.

11. A computer-implemented method according to claim 1, wherein automatically selecting the selected solution comprises automatically selecting the selected solution, such that the selected solution has a delivery delay jitter less than any other solution of the plurality of solutions.

12. A computer-implemented method according to claim 1, wherein the convex optimization problem comprises:

$$\underset{F}{\text{minimize}}$$

subject to $$F^T \sum F$$

$$e^T F = 1$$

$$F^T \mu = \mu^*$$

$$0 \le f_i \le 1, \quad i = 1, \ldots, n$$

where:
n is a number of routes in the plurality of routes;
$f_i$ denotes a fraction of a total flow between the originating node and the destination node, the fraction $f_i$ of the total flow assigned to route i of the plurality of routes;
F denotes a vector of the fractions $f_i$;
$\Sigma$ is a matrix of covariance among the n routes;
$\mu$ denotes a vector of mean delays, each respective route of the plurality of routes having a corresponding one of the mean delays;
$\mu^*$ denotes a pre-specified expected delay; and
e denotes a vector of all ones.

13. A computer-implemented method according to claim 1, wherein the convex optimization problem comprises:

$$\begin{aligned}&\underset{F}{\text{minimize}}\\&\text{subject to}\\&\quad C^T F + F^T \sum F\\&\quad e^T F = 1\\&\quad F^T \mu = \mu^*\\&\quad 0 \le f_i \le 1, \quad i = 1, \ldots, n\end{aligned}$$

where:

n is a number of routes in the plurality of routes;

$f_i$ denotes a fraction of a total flow between the originating node and the destination node, the fraction $f_i$ of the total flow assigned to route i of the plurality of routes;

F denotes a vector of the fractions $f_i$;

C denotes a cost vector whose $i^{th}$ element denotes cost per unit flow over route i;

$\Sigma$ is a matrix of covariance among the n routes;

$\mu$ denotes a vector of mean delays, each respective route of the plurality of routes having a corresponding one of the mean delays;

$\mu^*$ denotes a pre-specified expected delay; and e denotes a vector of all ones.

14. A system for reducing delivery delay jitter in a delivery network subject to variations in delivery delay time, the system comprising a processor configured to:

receive an electronic request to transport traffic between an originating node of the network and a destination node of the network, the electronic request specifying a maximum acceptable mean delivery delay time and a maximum acceptable jitter in the delivery delay time;

automatically identify a plurality of routes between the originating node and the destination node, each route of the plurality of routes having a respective mean delivery delay time, the plurality of routes thereby having a plurality of values of delivery delay time, and each route of the plurality of routes having a respective delivery delay jitter;

automatically solve a convex optimization problem for the plurality of values of delivery delay, thereby yielding a plurality of solutions, wherein each solution represents a corresponding allocation of the traffic among the plurality of routes, and each allocation of the traffic has a corresponding mean delivery delay time and a corresponding mean delivery delay jitter;

automatically select, from the plurality of solutions, a selected solution, wherein the selected solution has a mean delivery delay jitter less than the delivery delay jitter of any route of the plurality of routes; and automatically distribute the traffic over the plurality of routes according to the allocation of traffic that corresponds to the selected solution.

15. A non-transitory computer-readable medium encoded with instructions that, when executed by a processor, establish processes for performing a computer-implemented method of reducing delivery delay jitter in a delivery network subject to variations in delivery delay time, the processes comprising:

a process configured to receive an electronic request to transport traffic between an originating node of the network and a destination node of the network, the electronic request specifying a maximum acceptable mean delivery delay time and a maximum acceptable jitter in the delivery delay time;

a process configured to automatically identify a plurality of routes between the originating node and the destination node, each route of the plurality of routes having a respective mean delivery delay time, the plurality of routes thereby having a plurality of values of delivery delay time, and each route of the plurality of routes having a respective delivery delay jitter;

a process configured to automatically solve a convex optimization problem for the plurality of values of delivery delay, thereby yielding a plurality of solutions, wherein each solution represents a corresponding allocation of the traffic among the plurality of routes, and each allocation of the traffic has a corresponding mean delivery delay time and a corresponding mean delivery delay jitter;

a process configured to automatically select, from the plurality of solutions, a selected solution, wherein the selected solution has a mean delivery delay jitter less than the delivery delay jitter of any route of the plurality of routes; and a process configured to automatically distribute the traffic over the plurality of routes according to the allocation of traffic that corresponds to the selected solution.

* * * * *